(12) United States Patent
Menon et al.

(10) Patent No.: US 12,486,061 B2
(45) Date of Patent: *Dec. 2, 2025

(54) ROBOTIC KITTING SYSTEM

(71) Applicant: Dexterity, Inc., Palo Alto, CA (US)

(72) Inventors: Samir Menon, Palo Alto, CA (US); Robert Hegdahl, Hayward, CA (US); Zhouwen Sun, Redwood City, CA (US); Kevin Jose Chavez, Palo Alto, CA (US); Talbot Morris-Downing, Palo Alto, CA (US); Cuthbert Sun, Menlo Park, CA (US)

(73) Assignee: Dexterity, Inc., Redwood City, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/224,513

(22) Filed: Dec. 18, 2018

(65) Prior Publication Data
US 2020/0095001 A1 Mar. 26, 2020

Related U.S. Application Data

(63) Continuation-in-part of application No. 16/143,278, filed on Sep. 26, 2018, now Pat. No. 11,731,792.

(51) Int. Cl.
*B65B 5/08* (2006.01)
*B65B 5/12* (2006.01)
(Continued)

(52) U.S. Cl.
CPC .............. *B65B 35/54* (2013.01); *B65B 5/08* (2013.01); *B65B 5/12* (2013.01); *B65B 57/14* (2013.01);
(Continued)

(58) Field of Classification Search
CPC .. B65B 5/08; B65B 5/12; B65B 35/54; B65B 35/36; B65G 1/1373; B65G 1/1376; B65G 1/1378; B65G 47/14; B65G 47/766
(Continued)

(56) References Cited

U.S. PATENT DOCUMENTS 4,142,636 A 3/1979 Planke
4,189,273 A 2/1980 Soderstrom
(Continued)

FOREIGN PATENT DOCUMENTS

CN 101039854 9/2007
CN 103008258 4/2013
(Continued)

OTHER PUBLICATIONS

Bozer et al. Kitting versus line stocking: A conceptual framework and a descriptive model. International Journal of Production Economics, 28 28 (1992). pp. 1-19. (Received Mar. 3, 1991; accepted in revised form Mar. 15, 1992).

*Primary Examiner* — Thanh K Truong
*Assistant Examiner* — Patrick B Fry
(74) *Attorney, Agent, or Firm* — Van Pelt, Yi & James LLP

(57) ABSTRACT

A kitting system is disclosed. In various embodiments, the kitting system includes a conveyance structure configured to impart to an item a first net resultant force substantially in a first direction, wherein the first direction is associated with a direction of flow from a source end of the conveyance structure to a destination end opposite the source end and associated with a pick-up zone from which the item is to be retrieved; a sensor configured to provide a sensor output associated with the pick-up zone; and a processor configured to provide a control input to one or both of the conveyance
(Continued)

structure and a disrupter device associated with the conveyance structure based at least in part on the sensor output.

29 Claims, 12 Drawing Sheets

(51) Int. Cl.
| | |
|---|---|
| *B65B 35/36* | (2006.01) |
| *B65B 35/54* | (2006.01) |
| *B65B 57/14* | (2006.01) |
| *B65G 1/137* | (2006.01) |
| *B65G 43/08* | (2006.01) |
| *B65G 47/14* | (2006.01) |
| *B65G 47/26* | (2006.01) |
| *B65G 47/76* | (2006.01) |
| *B65G 65/00* | (2006.01) |

(52) U.S. Cl.
CPC ............ *B65G 43/08* (2013.01); *B65G 47/26* (2013.01); *B65G 65/005* (2013.01); *B65G 2201/02* (2013.01); *B65G 2205/00* (2013.01); *B65G 2814/0311* (2013.01)

(58) Field of Classification Search
USPC ................. 53/495, 500; 198/341.03, 341.07, 198/397.04, 412, 413, 347.1
See application file for complete search history.

(56) References Cited

U.S. PATENT DOCUMENTS

| | | | |
|---|---|---|---|
| 4,284,187 A | 8/1981 | Kramer | |
| 4,669,390 A | 6/1987 | Bisiach | |
| 4,736,831 A | 4/1988 | Fields | |
| 4,819,784 A | 4/1989 | Sticht | |
| 4,894,908 A | 1/1990 | Haba, Jr. | |
| 5,150,781 A | 9/1992 | Deisenroth | |
| 5,768,856 A * | 6/1998 | Odenthal | B65B 5/061 |
| | | | 198/430 |
| 6,210,079 B1 * | 4/2001 | Teoh | B23P 19/005 |
| | | | 406/12 |
| 6,275,743 B1 | 8/2001 | Kondo | |
| 6,711,798 B2 | 3/2004 | Sanders | |
| 6,804,880 B2 | 10/2004 | Yamamoto | |
| 6,883,297 B2 * | 4/2005 | Kirk | B65B 9/15 |
| | | | 53/131.2 |
| 8,276,739 B2 | 10/2012 | Bastian, II | |
| 8,660,688 B2 | 2/2014 | Urabe | |
| 8,755,931 B2 * | 6/2014 | Issing | B65G 1/1378 |
| | | | 700/214 |
| 9,346,630 B2 | 5/2016 | Nishizaka | |
| 9,481,518 B2 | 11/2016 | Neiser | |
| 9,492,923 B2 | 11/2016 | Wellman | |
| 9,592,759 B1 | 3/2017 | Theobald | |
| 9,669,543 B1 | 6/2017 | Stubbs | |
| 9,676,507 B2 * | 6/2017 | Kudia | B65B 11/025 |
| 9,688,472 B1 | 6/2017 | Stubbs | |
| 9,738,455 B2 * | 8/2017 | Neiser | B65G 43/08 |
| 9,926,138 B1 | 3/2018 | Brazeau | |
| 9,969,082 B1 | 5/2018 | Berard | |
| 9,996,805 B1 | 6/2018 | Lisso | |
| 10,124,489 B2 | 11/2018 | Chitta | |
| 10,360,531 B1 | 7/2019 | Stallman | |
| 10,392,190 B1 | 8/2019 | Theobald | |
| 11,325,782 B2 | 5/2022 | Avraham | |
| 2002/0063037 A1 | 5/2002 | Bruun | |
| 2004/0086364 A1 * | 5/2004 | Watanabe | B25J 9/0084 |
| | | | 414/416.01 |
| 2004/0093120 A1 | 5/2004 | Ebisawa | |
| 2004/0129150 A1 | 7/2004 | Lancaster, III | |
| 2007/0212174 A1 | 9/2007 | Hayashi | |
| 2011/0125307 A1 | 5/2011 | Dickson | |
| 2012/0209796 A1 | 8/2012 | Vashist | |
| 2012/0297733 A1 | 11/2012 | Pierson | |
| 2013/0110280 A1 | 5/2013 | Folk | |
| 2014/0207276 A1 | 7/2014 | Roush | |
| 2014/0244026 A1 | 8/2014 | Neiser | |
| 2015/0134110 A1 | 5/2015 | Koyanagi | |
| 2015/0371023 A1 | 12/2015 | Chen | |
| 2016/0089791 A1 | 3/2016 | Bradski et al. | |
| 2016/0221766 A1 | 8/2016 | Schroader | |
| 2017/0225330 A1 | 8/2017 | Wagner et al. | |
| 2017/0370025 A1 * | 12/2017 | Stephan | D01H 15/013 |
| 2018/0005148 A1 | 1/2018 | Yu | |
| 2018/0032949 A1 | 2/2018 | Galluzzo | |
| 2018/0164773 A1 | 6/2018 | Wang | |
| 2018/0194573 A1 | 7/2018 | Iwai | |
| 2019/0061151 A1 * | 2/2019 | Namiki | B65G 57/00 |
| 2019/0359424 A1 | 11/2019 | Avraham | |

FOREIGN PATENT DOCUMENTS

| | | |
|---|---|---|
| CN | 203170601 | 9/2013 |
| CN | 103596862 | 2/2014 |
| CN | 203528867 | 4/2014 |
| CN | 105129124 | 12/2015 |
| CN | 206050194 | 3/2017 |
| CN | 107000208 | 8/2017 |
| CN | 107108126 | 8/2017 |
| CN | 107697359 | 2/2018 |
| CN | 207001629 | 2/2018 |
| CN | 107876429 | 4/2018 |
| CN | 108349083 | 7/2018 |
| EP | 2233400 | 5/2013 |
| JP | S5374992 | 7/1978 |
| JP | S59190704 | 12/1984 |
| JP | H0540907 | 2/1993 |
| JP | H05112322 | 5/1993 |
| JP | H06239424 | 8/1994 |
| JP | H06312834 | 11/1994 |
| JP | H06329211 | 11/1994 |
| JP | H08197343 | 8/1996 |
| JP | 2006008279 | 1/2006 |
| JP | 2007238287 | 9/2007 |
| JP | 2011131901 | 7/2011 |
| JP | 2013082054 | 5/2013 |
| JP | 2016068161 | 5/2016 |
| JP | 2017537040 | 12/2017 |
| JP | 2018504333 | 2/2018 |
| KR | 20180100382 | 9/2018 |
| WO | 2010034044 | 4/2010 |
| WO | 2014013608 | 1/2014 |
| WO | 2018024311 | 2/2018 |
| WO | 2018089486 | 5/2018 |

* cited by examiner

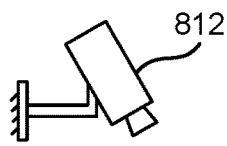
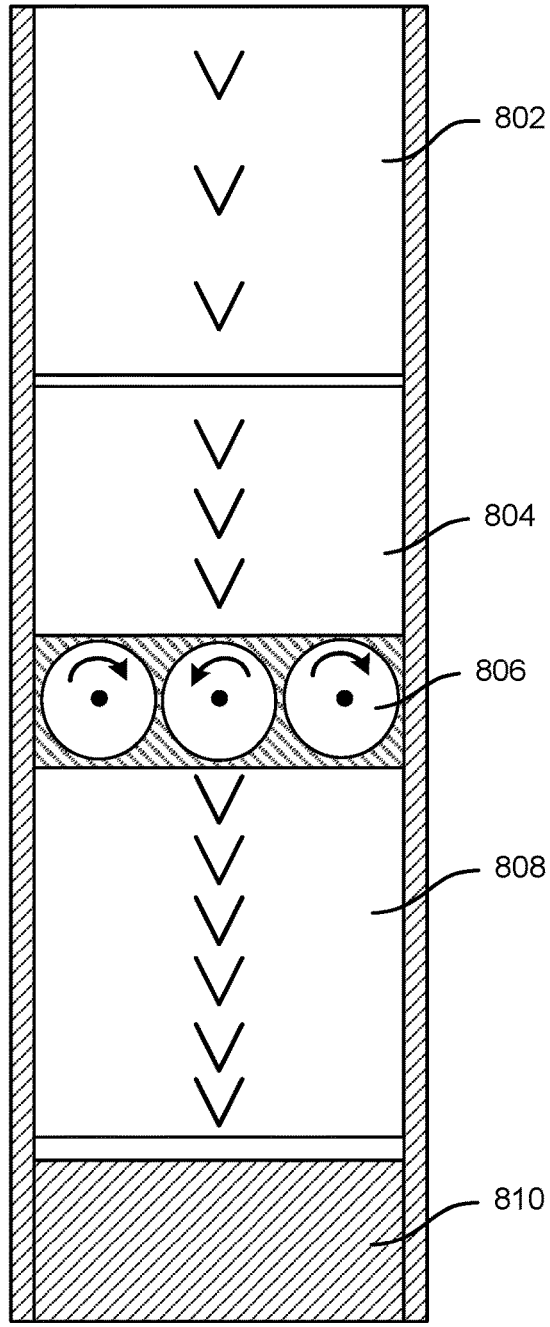
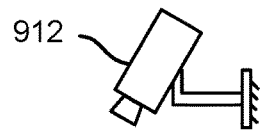
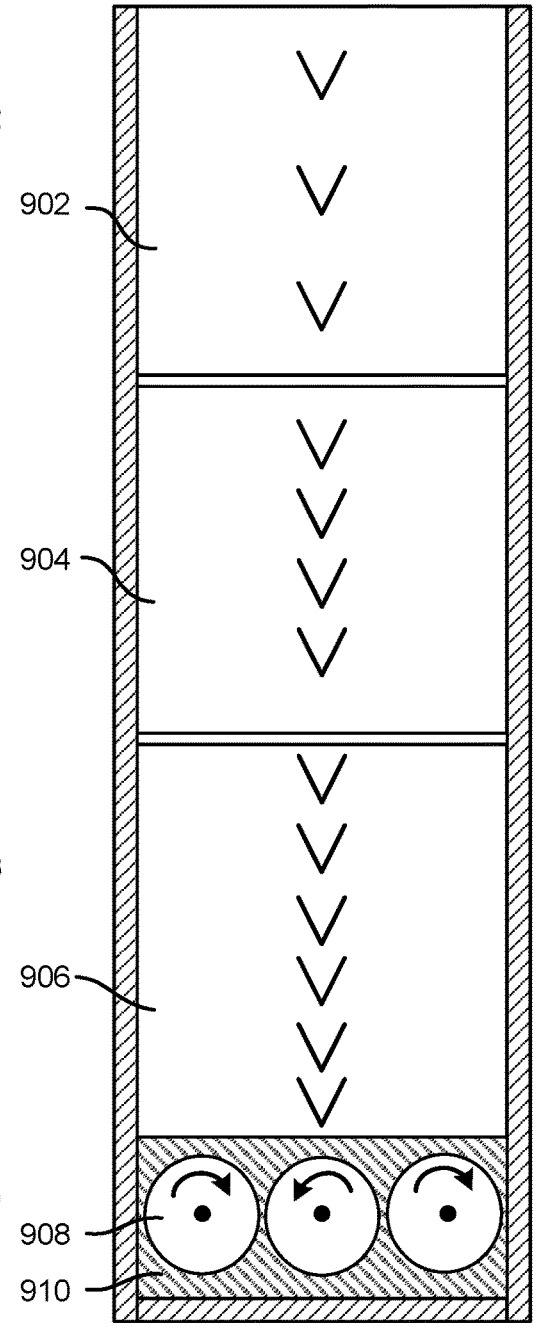
FIG. 8          FIG. 9

ROBOTIC KITTING SYSTEM

CROSS REFERENCE TO OTHER APPLICATIONS

This application is a continuation in part of co-pending U.S. patent application Ser. No. 16/143,278 entitled KITTING MACHINE filed Sep. 26, 2018, which is incorporated herein by reference for all purposes.

BACKGROUND OF THE INVENTION

Kitting and related processes typically involve gathering and packaging individual items together in a single kit or package. For example, an online or mail order retailer may collect individual items included in an order and package them together in a box or other packaging, which is then addressed and shipped to a destination address associated with the order.

Retailers and other vendors typically stock individual items they offer for sale. Such stock may be maintained in a warehouse or other storage facility. A process to fulfill an order may involve locating and selecting the ordered quantity of each individual item; selecting packaging, such as a box of a size and dimensions to accommodate the collection of items in the order; arranging items in the box or other packaging; addressing and shipping the package; processing a sale transaction; etc.

Kitting may be performed manually. For example, employees may collect items from shelves, bins, or other storage locations, each in a corresponding location within a warehouse or other facility. Aspects of kitting operations have been automated in part, such as box assembly. Use of robots or other machines to perform kitting operations has been proposed and explored, but challenges have been encountered, such as the relative complexity associated with using a robotic arm to find arbitrary quantities of an arbitrary set of items, and providing and programming a robot to perform tasks such as reaching into a bin or shelf, picking up items of arbitrary size, fragility, consistency, etc. As a result, large scale kitting operations have continued to be human labor intensive.

BRIEF DESCRIPTION OF THE DRAWINGS

Various embodiments of the invention are disclosed in the following detailed description and the accompanying drawings.

FIG. 8 illustrates an embodiment of a robotic kitting system.

FIG. 9 illustrates an embodiment of a robotic kitting system.

DETAILED DESCRIPTION

Figure 1:
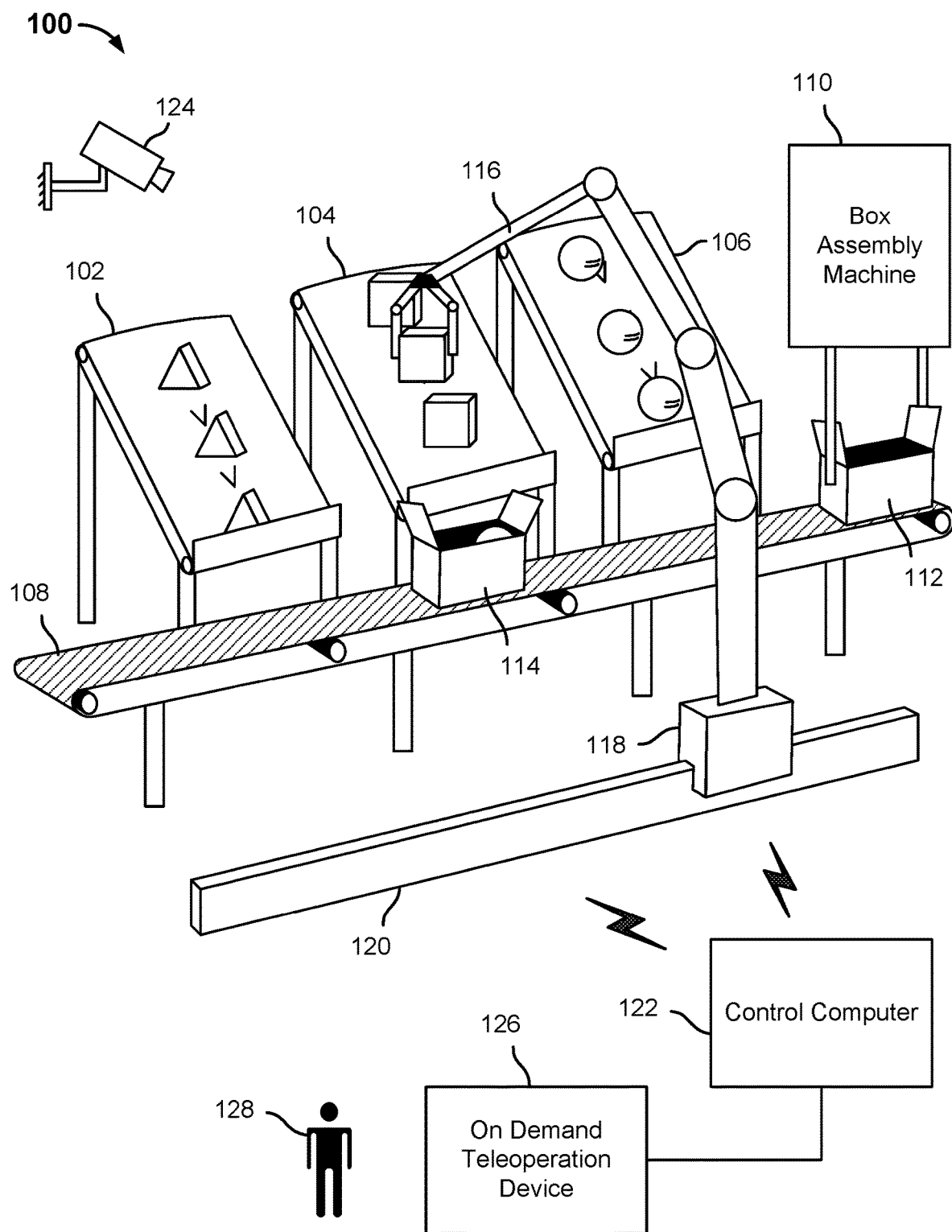
FIG. 1 is a diagram illustrating an embodiment of a kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Robotic kitting systems are disclosed. In various embodiments, a robotic kitting system as disclosed herein comprises an at least partly robotically controlled unit that supplies and positions an item to facilitate the item being located, picked up, and/or positioned in and/or for packaging and/or shipment as part of a kitting operation. In various embodiments, a robotic kitting system as disclosed herein may comprise one or more kitting system modules (KSM), each comprising a modular component. A KSM as disclosed herein may comprise one or more shelves, bins, or other receptacles. In some embodiments, the shelves, bins, or other receptacles may be positioned via robotic control to position an item of pick up. A KSM as disclosed herein may be integrated with one or more other KSM's, one or more robotic arms, and/or other components to comprise an at least partly automated kitting system, capable of locating, selecting, and packing prescribed quantities of each of one or more arbitrary individual items, such as items included in an order, invoice, or similar data.

In various embodiments, a robotic arm and/or a static, rail- or track-mounted, or mobile robot comprising a robotic arm or other appendage capable of retrieving items and placing them in a destination, such as a box or other packaging, is integrated with one or more KSMs as disclosed herein. The robotic arm retrieves items, as applicable, from the associated KSM(s) and places them in a box or other packaging for shipment.

In various embodiments, a robotic kitting system as disclosed herein includes one or more computer-controlled structures configured to convey and/or reposition an item for pick-up, e.g., by a robotic arm. One or more sensors, such as a camera, weight sensor, optical code or other scanner, computer vision, etc., may be used to determine to actuate a controlled structure to move or manipulate one or more items to better positions such item(s) for pick-up, e.g., by changing the spacing, orientation, arrangement, etc. of such item(s). Examples include without limitation change the operating speed of one or more conveyor belts or other conveyance devices; manipulating a paddle, baffle, or other structure to alter the trajectory or orientation of an item; operating cross- and/or contrary-running conveyance structures; and shaking, jolting, vibrating, or otherwise controllably manipulating a bin, table, or other pick-up zone from which items are retrieved, e.g., by a robotic arm.

The term "pick-up zone" is used herein to refer to a structure comprising a robotic kitting system as disclosed herein, from which one or more items may be picked up, e.g., by a robotic arm. A "pick-up zone" may be static, in various embodiments, and/or may be movable and/or comprise structures that can be moved under control of a computer or other processor to achieve a density, orientation, spacing, etc. of items in the pick-up zone that results in the robotic kitting system and/or a kitting system into which it is integrated to have or be more likely to have a strategy available to retrieve one or more items from the pick-up zone without human intervention.

In various embodiments, an integrated kitting system as disclosed herein operates in an autonomous manner unless/until the system gets stuck and has no strategy available to continue automated operation. In some embodiments, in response to entering such a state the system requests human intervention, e.g., by manual assistance, teleoperation, etc. In some embodiments, a human operator may initiate intervention. In various embodiments, in the event of and/or during or following human intervention the system continues to monitor state information and task progress. If a strategy to resume autonomous operation is determined, autonomous operation resumes.

FIG. 1 is a diagram illustrating an embodiment of a kitting system. In the example shown, kitting system 100 includes a set of kitting machines 102, 104, and 106 arranged in a line alongside a box conveyor 108. A box assembly machine 110 assembles boxes 112, 114 and places them on conveyor 108. In various embodiments, box assembly machine 110 may be controlled by and/or in communication with other elements of the kitting system 100, e.g., to coordinate/synchronize box size selection and the timing of the assembly and placement of boxes, e.g., boxes 112, 114, on conveyor 108.

In the example shown in FIG. 1, robotic arm 116 is mounted on carriage 118, which is configured to ride along a rail or other linear guide 120 disposed alongside and substantially parallel to the conveyor 108, on a side opposite the kitting machines 102, 104, and 106. In various embodiments, a motor, belt, chain, or other source of motive force is applied via a controller (not shown in FIG. 1) to move the carriage 118 and attached robotic arm 116 along the rail or guide 120 to facilitate the automated retrieval of items from the kitting machines 102, 104, and 106 and the placement of items in boxes 112, 114 as they are moved along conveyor 108.

While a horizontal, floor-mounted rail is shown in FIG. 1, in some embodiments a vertically mounted rail may be used. For example, robotic arm 116 may be raised or lowered on a vertical rail, and shelfs/bins may be positioned adjacent to the vertical rail to enable the robotic arm 116 to be moved to positions adjacent the shelfs/bins as needed to retrieve items.

In the example shown, operation of one or more of the kitting machines 102, 104, and 106; conveyor 108; box assembly machine 110; and robotic arm 116 and/or carriage 118 are operated in a coordinated manner under the control of control computer 122. In the example shown, control computer 122 is in wireless communication with controllers, not shown in FIG. 1, each configured to control operation of a corresponding element comprising system 100, e.g., kitting machines 102, 104, and 106; conveyor 108; box assembly machine 110; and robotic arm 116 and/or carriage 118. While wireless connections are shown in FIG. 1, in various embodiments wired connections or a combination of wired and wireless connections may be used.

In the example shown in FIG. 1, robotic arm 116 terminates in a two-digit gripper. In various embodiments, robotic arm 116 may terminate in one or more other and/or different types of retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction, friction, electrostatic force, magnetic force, etc. In some embodiments, the gripper of robotic arm 116 may be interchanged with one or more different terminal devices, depending on one or more attributes of an item to be retrieved, e.g., weight, fragility, compressibility, rigidity, size, shape, etc. In some embodiments, the gripper of robotic arm 116 may be used to retrieve and use different gripper-held tools to items, depending on one or more attributes of the item to be retrieved, for example.

In various embodiments, control computer 122 is configured, e.g., by software running on control computer 122, to receive data associated with an invoice, order, part list, pick list, or other list of items to be retrieved and packed together; determine a strategy/plan to fulfill the retrieve and pack the required items; and operate elements of system 100, e.g., kitting machines 102, 104, and 106; conveyor 108; box assembly machine 110; and robotic arm 116 and/or carriage 118, in coordination to fulfill the requirement(s).

For example, in some embodiments, control computer 122 is configured to receive a list of items to be packed. Control computer 122 determines which items are associated with which of the kitting machines 102, 104, and 106 and makes a plan to retrieve and pack the items. Control computer 122 controls box assembly machine 110 to assembly a box (e.g., 112, 114) and deposit it on conveyor 108 and controls the conveyor 108 to advance the box to a position to be loaded with a first one or more items. The control computer 122 controls the carriage 118 and/or robotic arm 116 as needed to position the robotic arm 116 to retrieve the first one or more items from the associated one(s) of the kitting machines 102, 104, and 106. Control computer 122 may control the kitting machines 102, 104, and 106, e.g., to ensure the require item(s) in the required quantities are present in the pick-up zone at the end of kitting machines 102, 104, and 106 nearest to the conveyor 108 and robotic arm 116. Control computer 122 controls robotic arm 116 to retrieve the item(s) from the corresponding pick-up zone(s) and places them in the box (e.g., 112, 114) before moving on to perform coordinated retrieval and packing of any further items required to be included in that particular kit. Once all items have been retrieved and packed, control computer 122 controls conveyor 108 to advance the box (e.g., 112, 114) to a next stage of fulfillment, not shown in FIG. 1, e.g., a station at which the box is sealed, labeled, and sent to be shipped.

In the example shown in FIG. 1, kitting machines 102, 104, and 106 comprise angled conveyors configured to be loaded, e.g., by human workers, robots, and/or other machines, or some combination thereof, from a back end (upper/left as shown in FIG. 1). Items may be scanned, recognized by computer vision, etc. to determine and store on control computer 122 data associating the item and/or item type or other items attributes associated with each kitting machine. While in the example shown all three of the kitting machines 102, 104, and 106 are conveyors, in various embodiments a mix of different types of kitting machine may be included in a kitting system such as system 100. For example, the items shown in FIG. 1 as being supplied via kitting machine 106 may be supplied in some embodiments via a stationary ramp down which the items are rolled. In some embodiments, a kitting machine may comprise any one of a plurality of structures and mechanisms to supply items to an associated pick zone, including without limitation a gravity type conveyor having a plurality of adjacent rollers, a ramp, a conveyor belt, a set of revolving bins, etc.

In various embodiments, system 100 is initialized by having control computer 122 determine through automated processing, manual configuration, and/or a combination thereof the placement, type, capabilities, etc. of each kitting machine (e.g., 102, 104, and 106) and the item(s) associated with each kitting machine. In addition, elements of system 100 may register with the control computer 122. Registration may include admitting an element, such as each of the kitting machines 102, 104, and 106, to a control network. In some embodiments, operational tests may be performed. For example, control computer 122 may test its ability to control a newly-registered element, such as by operating the conveyor belt of a kitting machine, such as kitting machines 102, 104, and 106, in the forward and back directions, at various speeds, etc.

In various embodiments, elements of system 100 may be added, removed, swapped out, etc. In such an instance, control computer 122 initializes and registers the new element, performs operational tests, and begins/resumes kitting operations, incorporating the newly added element, for example.

Referring further to FIG. 1, in the example shown system 100 includes a video camera 124 configured to capture video images of the elements comprising system 100. Camera 124 may be one of a plurality of sensors used by control computer 122 to control the elements comprising system 100. For example, in the example shown, video generated by camera 124 and sent to control computer 122 may be used by control computer 122 to control the speed and/or direction of the conveyor belts comprising the kitting machines 102, 104, and 106 to ensure a sufficient and not excessive number of items are available in the pick-up zone and/or to position or reposition the items for retrieval by robotic arm 116. In addition, camera 124 and/or other cameras may be used to facilitate robotic arm 116 picking up an item and/or placing the item in its box (e.g., 112, 114). In various embodiments, a plurality of cameras may be deployed in a number of locations, including in the environment and on the respective elements comprising system 100, to facilitate automated (and, if needed, human assisted) kitting operations. In various embodiments, sensors other than cameras may be deployed, including without limitation contact or limit switches, pressure sensors, weight sensors, and the like.

In various embodiments, control computer 122 is programmed to determine a plan to fulfill a kitting requirement based at least in part on a model of the robotic arm 116 and other elements comprising the system 100, e.g., kitting machines 102, 104, and 106; conveyor 108; box assembly machine 110; and robotic arm 116 and/or carriage 118. The respective models in various embodiments reflect capabilities and limitations of each respective element. For example, the kitting machines 102, 104, and 106 are in fixed positions in this example, but each has a conveyor belt which may be capable of being moved in forward and back directions and/or at different speeds. In addition, the control computer 122 may use information stored in connection with initialization and/or configuration, e.g., which items are on which location(s) on which kitting machine(s), where each kitting machine and/or its associated pick up zone is located, etc., to determine a plan to fulfill a requirement. In addition, control computer 122 may use data determine based at least in part on sensor data, such as video captured by camera 124, to make a plan to fulfill a requirement.

In various embodiments, control computer 122 is configured to formulate and/or update or reformulate a plan to fulfill a requirement, and to implement or attempt to implement the plan, by employing strategies to do a (next) task or subtask that have been programmed into and/or learned by control computer 122. Examples include, without limitation, strategies to use robotic arm 116 to pick up a given item based on attributes of the item (rigidity, fragility, shape, orientation, etc.). In some embodiments, control computer 122 is programmed to use a first (e.g., preferred or best) strategy to attempt to perform a task (e.g., pick up an item with robotic arm 116), and if that fails then to determine and use an alternate strategy, if one is available (e.g., use the robotic arm 116 to nudge the item then try again, operate the conveyor or other instrumentality of the kitting machine, e.g., 102, 104, and 106, forward and/or backward a bit and try again, etc.).

In the example shown in FIG. 1, control computer 122 is connected to an on demand teleoperation device 126 operated by a human operator 128. While in FIG. 1 teleoperation device 126 is operated by a human operator 128, in some embodiments teleoperation device 126 may be operated by a non-human operator, such as a highly skilled robot. In various embodiments, control computer 122 is configured to invoke on demand teleoperation based at least in part on a determination by control computer 122 that it does not have an available strategy to continue/complete a kitting operation and/or a component task thereof through fully automated operation. For example, an item is dropped in a location from which the robotic arm 116 cannot retrieve it; or, an item has been attempted to be picked up a prescribed maximum number of attempts and has not successfully been retrieved; etc. Based on such a determination, control computer 122 sends an alert or other communication to on demand teleoperation device 126, prompting human operator 128 to use teleoperation device 126 to operate one or more elements of system 100—e.g., one or more of kitting machines 102, 104, and 106; conveyor 108; box assembly machine 110; and robotic arm 116 and/or carriage 118—to perform at least the task or subtask the system 100 was not able to complete under fully automated control by control computer 122.

Examples of teleoperation device 126 include without limitation a tablet or other mobile device having a graphical user interface to control elements of system 100, a desktop or other computer having one or more input devices connected thereto to operate elements of system 100 remotely etc.

While in some embodiments control computer 122 invokes on demand teleoperation, in some embodiments a human operator such as operator 128 may monitor automated operation of system 100, e.g. via a video feed generated by camera 124, and may intervene to operate elements of system 100 by teleoperation if the human operator determines there is a need to intervene or assist.

In various embodiments, teleoperation device 126 and/or human operator 128 may be located remotely from a physical site at which system 100 is located and operates (mostly) in a fully automated mode. Similarly, control computer 122 may be located remotely from the site at which other elements of system 100 are located and/or a portion of the work described herein as being performed by control computer 122 may be performed by a computer located remotely from that site.

In various embodiments, control computer 122 is configured to learn new or improved strategies to employ elements of system 100 to perform kitting operations. For example, control computer 122 in some embodiments is programmed to record actions by a human operator (128) via teleoperation (126) and to update its model(s), strategies, etc., as appropriate to be able to repeat and/or emulate the actions of the human operator to perform the task or subtask for which teleoperation was required.

In various embodiments, control computer 122 is configured to continue to evaluate, during teleoperation, whether it has a viable plan and/or strategy to resume automated fulfillment of the current requirement. If so, control computer may be configured to resume automated operation, either proactively or by advising the human operator that control can be returned to control computer 122.

While in the example shown in FIG. 1 the boxes 112, 114 are moved by conveyor 108 into successive positions opposite the kitting machines 102, 104, and 106, in other embodiments the boxes 112, 114 may be place in a single, central position, by conveyor 108 or in some embodiments manually or by a machine other than conveyor 108, and may be filled by moving the robotic arm 116 into one or more positions to access and pick up items from the kitting machines 102, 104, and 106 and place them in the box 112, 114.

While a "kitting" operation is shown in FIG. 1 and described herein with reference to FIG. 1 and other Figures, in various embodiments kitting machines and integrated systems as disclosed herein may be used to perform the reverse operation, e.g., by stocking shelves, bins, and/or kitting machines with items removed from an initially full or partly full box of items. For example, in the example shown in FIG. 1, the box 114 may include a plurality of items associated with kitting machine 104, and robotic arm 116 may be used to remove items from the box 114 and place them on the kitting machine 104, e.g., from the back or supply end as shown.

In some embodiments, items on a kitting machine, such as machines 102, 104, and 106, or on a static shelf accessed by a kitting system as disclosed herein, may be supplied in bins. In some embodiments, the system (e.g., system 100 of FIG. 1) is configured to detect, e.g., based on computer vision or other sensors and/or techniques, that a bin is empty, and to clear the bin from the kitting machine or shelf by using a robotic arm to pick up the bin and place it in a corresponding empty bin location, e.g., a nearby stack of empty bins, etc. In some embodiments, automated bin clearing makes room from a next bin that is not empty to move into position on the kitting machine or shelf to enable a robotic arm to access and pick up items from the bin.

A technical obstacle to performing a robotic kitting operation as illustrated in FIG. 1, for example, is the limited grasping agility of the robotic arm and/or gripper. For example, the robotic arm may have limited range of motion and degrees of freedom, and/or the gripper may have limited dexterity (e.g., few joints) and/or grasping ability (e.g., slipper fingers, only two or three fingers, etc.). Due to such limitations, more successful strategies may be available to retrieve objects from overhead and the system may be more likely to be able to grasp a given object of arbitrary shape if the object is oriented in a way that exposes more easily grasped features to being engaged from overhead and/or if items are not clumped too closely together, stacked on one another, etc.

In various embodiments, techniques disclosed herein are used to increase the likelihood the system will remain in autonomous operation, including by positioning items in a manner conducive to being retrieved successfully by a robotic arm and/or associated gripper. For example, in various embodiments cameras and/or other sensors are used to monitor one or both of the flow of items to a pick up zone of a kitting machine, such as kitting machines 102, 104, and 106 of FIG. 1, and the arrangement of items in the pick up zone, and to control instrumentalities of the kitting machine, e.g., conveyors, paddles or baffles, air blasts, etc., to cause the item(s) to be arranged (e.g., oriented, spaced, etc.) in the pick-up zone of the kitting machine in a manner that facilitates their being retrieved from the kitting machine, e.g., by a robotic arm and gripper such as robotic arm 116 of FIG. 1, in an autonomous mode.

Figure 2:
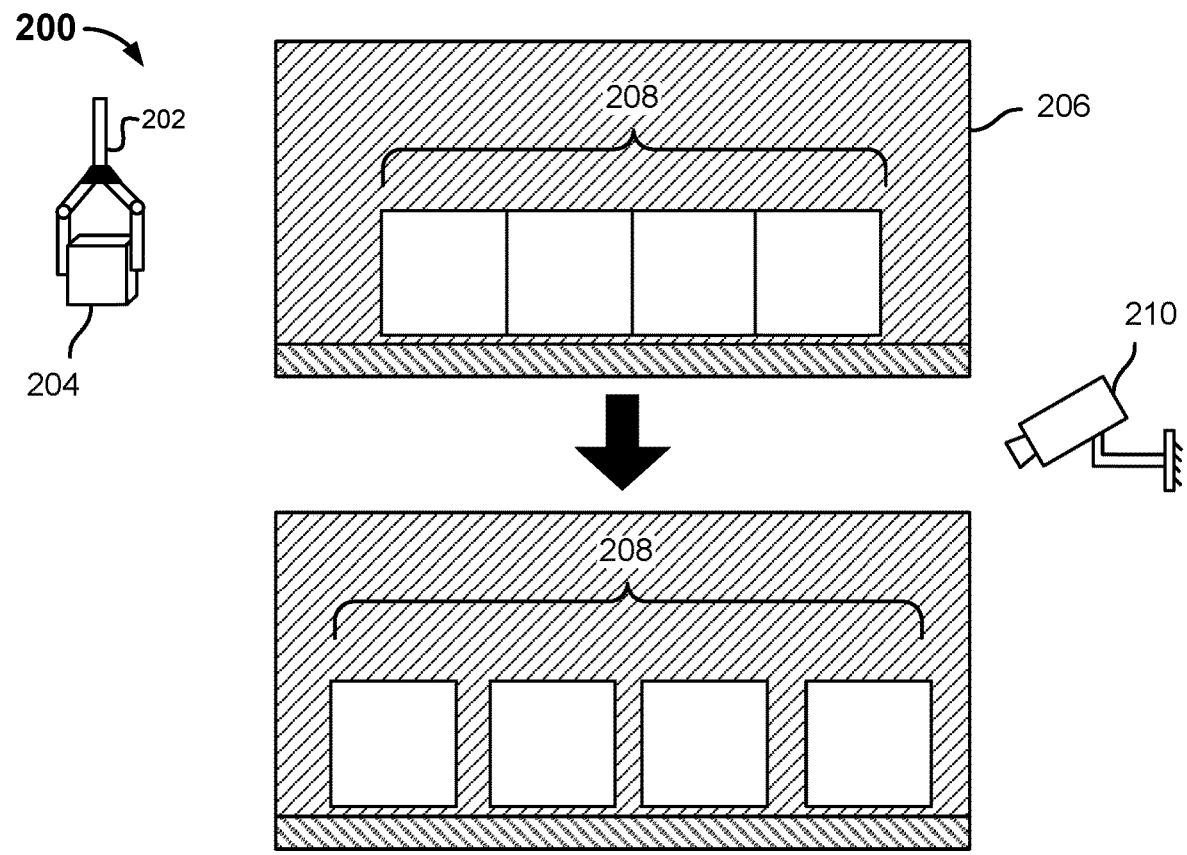
FIG. 2 illustrates an example of a pick-up zone in an embodiment of a robotic kitting system.

FIG. 2 illustrates an example of a pick-up zone in an embodiment of a robotic kitting system. In various embodiments, the robotic kitting system 200 of FIG. 2 is included in an integrated kitting system, such as system 100 of FIG. 1. In the example shown, a robotic arm terminating in a gripper 202 is used to retrieve items such as item 204 from a pick-up zone 206. In various embodiments, the pick-up zone 206 may comprise a table, ramp, or other surface; one or more sidewalls; and/or a bin or other receptacle.

In the example shown, a plurality of items 208 has not yet been retrieved from pick-up zone 206. In the upper image the items 208 are clumped together, which in some embodiments may leave a kitting system into which robotic kitting system 200 is integrated without a strategy to successfully retrieve one of the items 208 from the pick-up zone 206 using robotic arm and gripper 202. For example, with the items 208 clumped as shown in the upper drawing of FIG. 2, a processor comprising the robotic kitting system (not shown) may not have a strategy to pick up one of the items 208 because there is not room to place the digits of gripper 202 on opposite sides of any one of them to pick it up, due to the presence of other items 208 or structures comprising the pick-up zone 206 adjacent to at least two sides of each item 208.

In the example shown in FIG. 2, camera 210 is positioned to generate an image of items in pick-up zone 206, such as items 208 as shown. In some embodiments, a processor comprising and/or associated with kitting system 200 receives image data generated by camera 210 and uses the image data to determine whether a strategy is available to retrieve a next item, e.g., one of the items 208, from the pick-up zone without human intervention. In some embodiments, the processor is configured to manipulate structures comprising the pick-up zone 206 to redistribute or otherwise reposition items in the pick-up zone 206, e.g., items 208. Examples of structures manipulated by the processor in various embodiments include without limitation linear motors to shake a surface comprising pick-up zone 206 in the x- and/or y-direction(s); vibrators or other structures to impart vibration to the pick-up zone 206; structures to move one or more corners, sides, etc. of the pick-up zone 206 up and/or down in the z-direction; and using the robotic arm and gripper 202 to push items 208 around until a more spaced out distribution is achieved.

In various embodiments, a processor comprising robotic kitting system 200 manipulates the pick-up zone 206 to achieve a distribution such as shown in the lower drawing of FIG. 2, in which items 208 are spaced apart sufficiently for the gripper 202 to be used to retrieve individual ones of the items 208, e.g., by picking them up from above. In various embodiments, the processor iteratively manipulates the pick-up zone 206, processes image data from camera 210 to determine if a strategy is available to pick up a next one of the items 208, until a strategy is available and/or the processor determines a prescribed number of attempts have been made. In some embodiments, if after a prescribed number of iterations no strategy to retrieve an item has become available, the processor invokes on demand human teleoperation (or, in some embodiments, other human intervention). A human operator may use the robotic arm and gripper 202 to move items apart to retrieve them, for example. In some embodiments, the robotic kitting system continues to process image data from camera 210. Once the human teleoperation (or other intervention) is determined by the processor to have resulted in conditions in which fully automated operation can be resumed, in various embodiments the processor resumes automated operation and/or provides an indication to the human operator that automated operation can resume. For example, once based on the image data from camera 210 the robotic kitting system determines a strategy exists to pick up a next one of the items 208 without further human intervention, the processor in some embodiments resumes (or indicates readiness to resume) automated operation.

In some embodiments, a processor comprising robotic kitting system 200 uses image data generated by camera 210 to anticipate a resulting quantity, distribution, and/or position of items in the pick-up zone 206, and to manipulate based on such processing one or more mechanisms configured to participate in delivering items such as items 208 to pick-up zone 206. For example, conveyors, powered rollers, movable paddles or baffles, etc., may be manipulated in various embodiments to achieve or increase the likelihood of achieving a less densely packed distribution, as in the lower drawing of FIG. 2.

Figure 3:
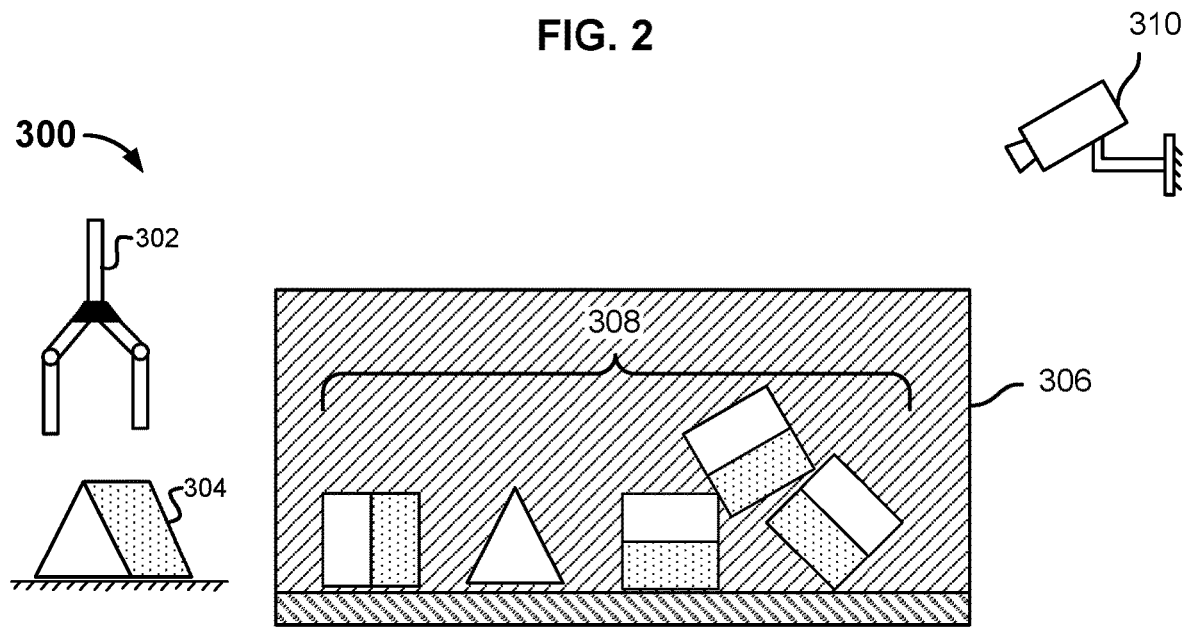
FIG. 3 illustrates an example of a pick-up zone in an embodiment of a robotic kitting system.

FIG. 3 illustrates an example of a pick-up zone in an embodiment of a robotic kitting system. In the example shown, robotic kitting system 300 uses a robotic arm terminating in gripper 302 to retrieve items such as item 304 from pick-up zone 306. Additional items 308 are shown in pick-up zone 306. In this example, the item 304 and items 308 comprise right triangular prisms, each with two opposite triangular sides joined by three rectangular faces. In this example, robotic kitting system 300 may have (more) strategies to retrieve on of the items 304, 308 by using the gripper 302 to engage and provide inward pressure on the opposite triangular sides, as opposed to angled rectangular sides. In the example shown, a processor (not shown) comprising robotic kitting system 300 may use image data generated by camera 310 to determine that strategies (or higher confidence strategies) exist to retrieve one or more of the three items 308 on the right hand side of pick-up zone 306, as shown, than are available to retrieve the two items 308 on the left. In various embodiments, automated processing may be performed to retrieve the three items 308 on the right. If not strategy otherwise exists to retrieve the remaining items, in various embodiments, the processor (not shown) is configured to manipulate the pick-up zone 306 to change the position and/or orientation of the items 308 on the left and then use image data generated by camera 310 to determine if a strategy has become available to retrieve one or more of the repositioned items. If so, the item(s) is/are retrieved. If not, further iterations of manipulation and evaluation may be performed, as described above, and in some embodiments human intervention (e.g., through teleoperation) may be invoked, if needed.

Figure 4:
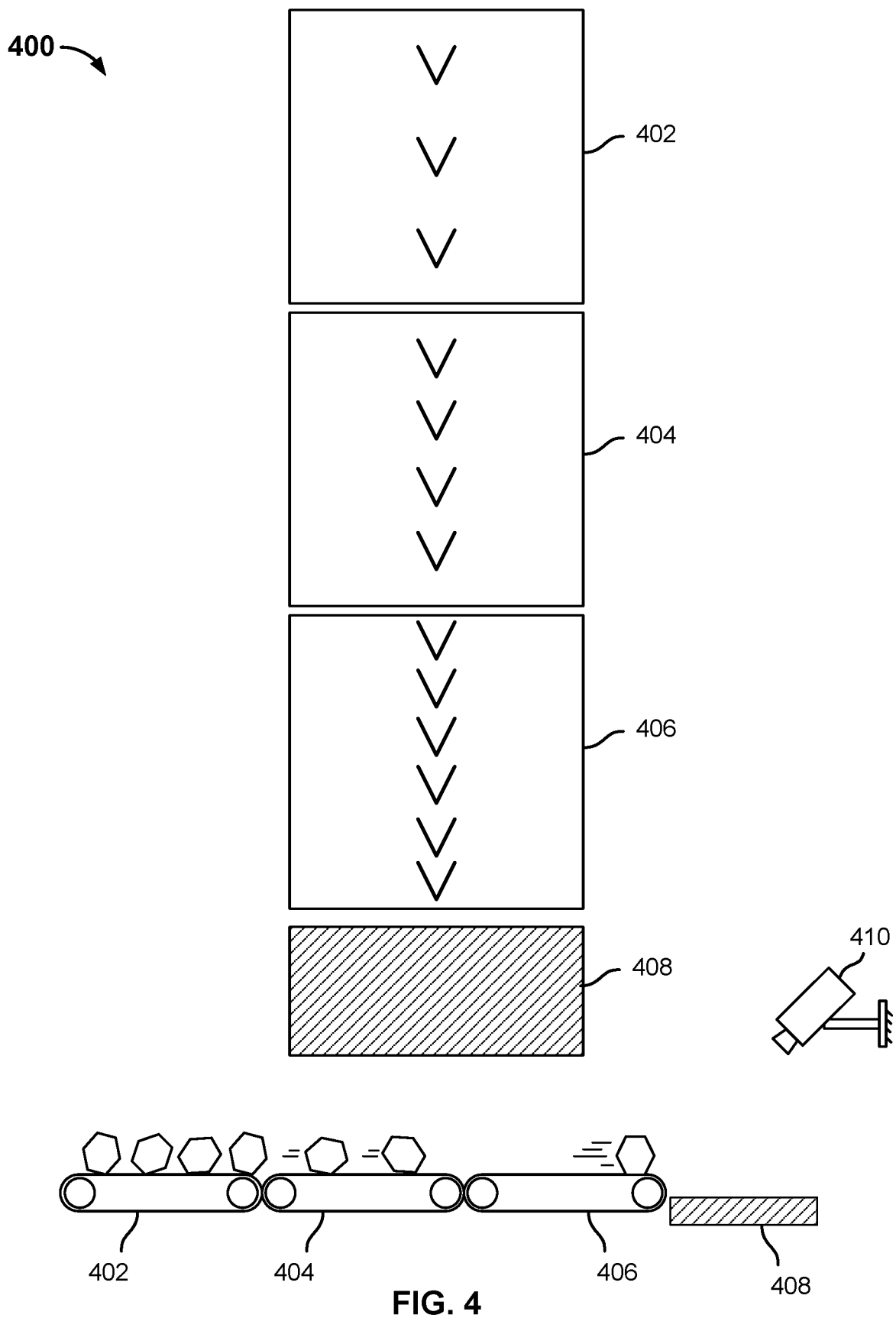
FIG. 4 illustrates an embodiment of a robotic kitting system.

FIG. 4 illustrates an embodiment of a robotic kitting system. In the example shown, robotic kitting system 400 includes a multistage conveyor comprising computer-controlled conveyor belts 402, 404, and 406, positioned and configured to deliver items to pick-up zone 408 for retrieval by a robotic arm and gripper (not shown). The lower drawing shows a side view illustrating the conveyors 402, 404, and 406 being operated at different speeds, in this example each faster than the one preceding it, to create a desired spacing/timing in the arrival at the pick-up zone 408 of items to be retrieved from the pick-up zone 408. In the example shown, camera 410 generates image data showing one or both of the pick-up zone 408 and (at least portions of) the conveyors 402, 404, and 406. In some embodiments, multiple cameras 410 and/or other sensors (for example, and without limitation, additional cameras, optical scanners, and other optical sensors; pressure sensors, weight sensors, limit switches, and other contact sensors; etc.) may be used to monitor the pick-up zone 408 and/or the conveyors 402, 404, and 406. The conveyors 402, 404, and 406 may be started/stopped and/or operated at increased or decreased speed, as needed, to achieve a desired density, distribution, position, etc. of items in the pick-up zone 408. For example, if too many items are already present in the pick-up zone 408, one or more of the conveyors 402, 404, and 406 may be stopped or slowed considerably. Alternatively, if items are being clumped too densely in the pick-up zone 408, the conveyors 404 and/or 406 may be operated more quickly and/or more quickly relative to conveyor 402, e.g., to create greater spacing between items as they arrive at the pick-up zone 408.

In various embodiments, the conveyors 402, 404, and 406 are operated under computer control based on inputs such as packing list data indicating the quantity and/or type of item(s) required to be packed in a kit (e.g., box) that is currently being assembled, etc. For example, if the items supplied by the robotic kitting system 400 have already been packed in the current kit/box, or if no (further) items supplied by the elements shown in FIG. 4 are required, then in some embodiments the elements shown in FIG. 4 may be stopped until more items supplied by the robotic kitting system 400 of FIG. 4 are required, e.g., for a next kit (box).

Figures 5A, 5B:
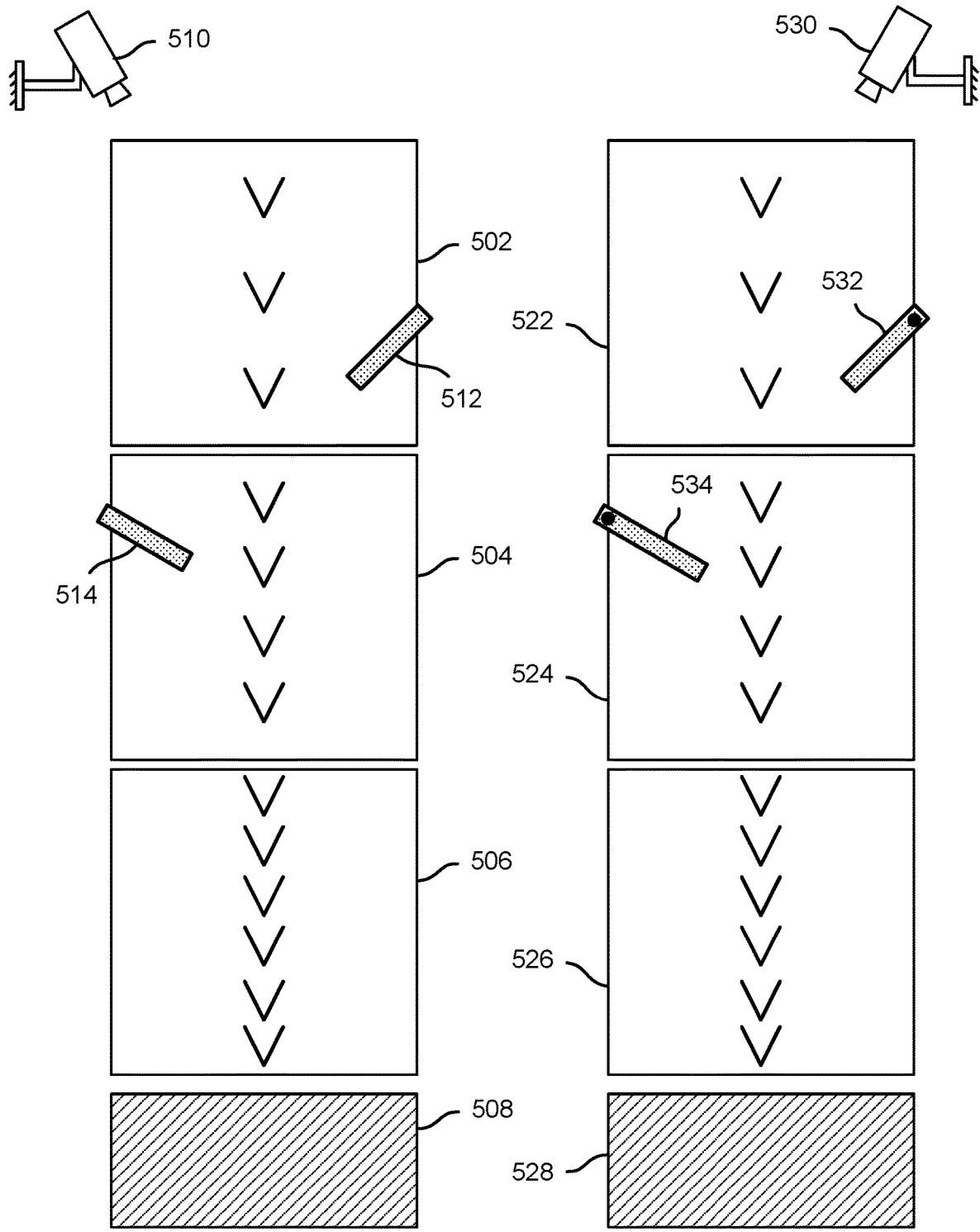
FIG. 5A illustrates an embodiment of a robotic kitting system.
FIG. 5B illustrates an embodiment of a robotic kitting system.

FIG. 5A illustrates an embodiment of a robotic kitting system. In the example shown, the kitting system includes a plurality of conveyors 502, 504, and 506 configured to deliver items to pick-up zone 508. In various embodiments, the conveyors 502, 504, and 506 are operated under control of a computer or other processor (not shown) configured to receive and use image data from camera 510 to cause items to be delivered to pick-up zone 508 in a manner calculated to achieve a desired quantity, density, and/or position of items in the pick-up zone 508. In the example shown, stationary baffles 512 and 514 impart repositioning forces to items that contact them on the way to pick-up zone 508. In various embodiments, baffles 512 and 514 tend to direct items to a more centered position on the conveyors 502, 504, and/or 506 and/or pick-up zone 508, and may rotate or otherwise alter the position of items that contact the baffles 512 and/or 514, decreasing the likelihood of overly dense packing of items in pick-up zone 508, for example.

FIG. 5B illustrates an embodiment of a robotic kitting system. In the example shown, the kitting system includes variable-speed, computer-controlled conveyors 522, 524, and 526; pick-up zone 528; camera 530; a computer or other processor (not shown); and computer-controlled repositionable baffles 532 and 534. In various embodiments, a computer or other processor controls the respective speed of the conveyors 522, 524, and 526 and/or the position of one or both of the baffles 532, 534, based on image data generated by camera 530, to achieve a desired quantity, density, and/or position of items in pick-up zone 528.

For example, if based on image data generated by camera 530 the processor determines a density of items on the right side of pick-up zone 528 as shown is becoming too great, in some embodiments the processor may rotate baffle 532 up to a more horizontal position, to act as a barrier, and/or may rotate baffle 534 down to a more vertical position (as shown) to direct fewer items to the center/right side of the conveyors 524 and/or 526. Once a lower density has been achieved on the right side of pick-up zone 528, e.g. by retrieving and packing items from that side while directing the supply of items to the center/left side, as described above, in some embodiments the processor may further adjust the baffles 532, 534, e.g., based on more recent images from camera 530.

Figures 6, 7:
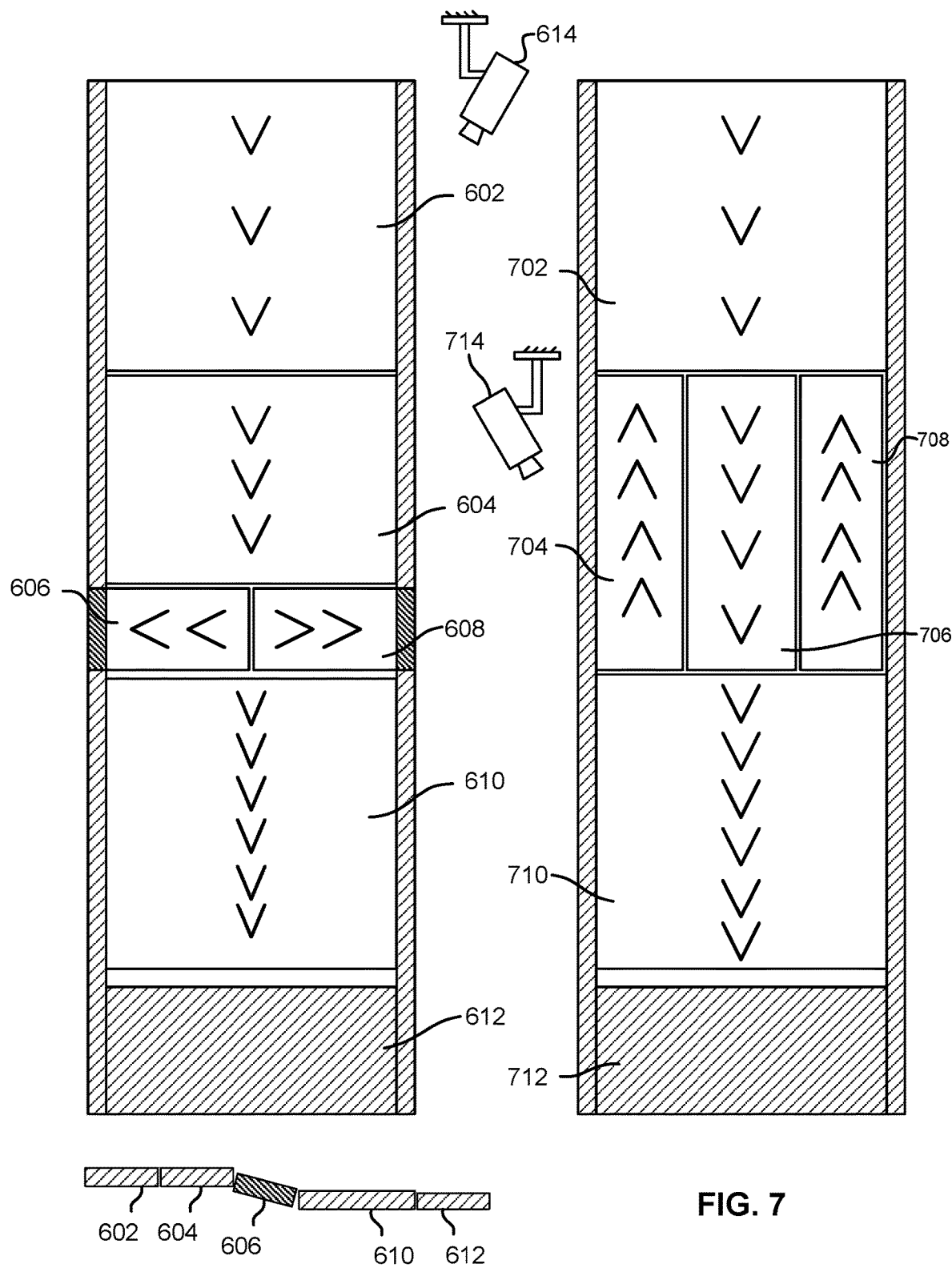
FIG. 6 illustrates an embodiment of a robotic kitting system.
FIG. 7 illustrates an embodiment of a robotic kitting system.

FIG. 6 illustrates an embodiment of a robotic kitting system. In the example shown, the robotic kitting system includes a plurality of computer-controlled conveyors 602, 604, 606, 608, and 610 configured to deliver items to pick-up zone 612. In various embodiments, the conveyors 602, 604, 606, 608, and 610 are operated under control of a computer or other processor (not shown) configured to receive and use image data from camera 614 to cause items to be delivered to pick-up zone 612 in a manner calculated to achieve a desired quantity, density, and/or position of items in the pick-up zone 612. In the example shown, conveyors 606 and 608 run in opposite directions orthogonal to the direction of flow/supply of conveyors 602, 604, and 610. As shown in the image at bottom of FIG. 6, the sideways (outward) operating conveyors 606 and 608 are angled downward to deliver items to conveyor 610 located at a lower level. The downward angle results in items fed by conveyors 602 and 604 continuing to flow towards the pick-up zone 612 while being pulled outward by conveyors 606 and 608 operated under computer control based on image data generated by camera 614, in various embodiments, to achieve a desired quantity, distribution, and orientation of items in pick-up zone 612.

FIG. 7 illustrates an embodiment of a robotic kitting system. In the example shown, the robotic kitting system includes a plurality of computer-controlled conveyors 702, 704, 706, 708, and 710 configured to deliver items to pick-up zone 712. In various embodiments, the conveyors 702, 704, 706, 708, and 710 are operated under control of a computer or other processor (not shown) configured to receive and use image data from camera 714 to cause items to be delivered to pick-up zone 712 in a manner calculated to achieve a desired quantity, density, and/or position of items in the pick-up zone 712. In the example shown, conveyors 704 and 708 run opposite the direction of flow/supply of items toward pick-up zone 712. For larger items, for example, such counter-running conveyors 704, 708 may enable items to be twisted/rotated, spaced out, etc., by operating the conveyors 704 and 708 under control of a computer or other processor, based on image data generated by camera 714, to achieve and/or maintain a desired quantity, distribution, and orientation of items in pick-up zone 712. In some embodiments, one or more of the conveyors 702, 704, 706, 708, and 710 may be reversible and may be operated in a direction opposite that shown in FIG. 7, e.g., to achieve a desired quantity, distribution, and orientation of items in pick-up zone 712.

FIG. 8 illustrates an embodiment of a robotic kitting system. In the example shown, the robotic kitting system includes a plurality of computer-controlled conveyors 802, 804, and 808, and a set of counter-rotating turntables 806, configured to deliver items to pick-up zone 810. In various embodiments, the conveyors 802, 804, and 808 and turntables 806 are operated under control of a computer or other processor (not shown) configured to receive and use image data from camera 812 to cause items to be delivered to pick-up zone 810 in a manner calculated to achieve a desired quantity, density, and/or position of items in the pick-up zone 810. In some embodiments, one or more of the conveyors 802, 804, and 808 and turntables 806 may be reversible and may be operated in a direction opposite that shown in FIG. 8, e.g., to achieve a desired quantity, distribution, and orientation of items in pick-up zone 810.

FIG. 9 illustrates an embodiment of a robotic kitting system. In the example shown, the robotic kitting system includes a plurality of computer-controlled conveyors 902, 904, and 906 configured to deliver items to pick-up zone 910. The pick-up zone 910 is equipped with a set of counter-rotating turntables 908 to redistribute and/or reorient items present in pick-up zone 910. In various embodiments, the conveyors 902, 904, and 906 and turntables 908 are operated under control of a computer or other processor (not shown) configured to receive and use image data from camera 912 to cause items to be delivered to and/or manipulated while in pick-up zone 910 in a manner calculated to achieve a desired quantity, density, and/or position of items in the pick-up zone 910. In some embodiments, one or more of the conveyors 902, 904, and 906 and turntables 908 may be reversible and may be operated in a direction opposite that shown in FIG. 9, e.g., to achieve a desired quantity, distribution, and orientation of items in pick-up zone 910.

Figure 10:
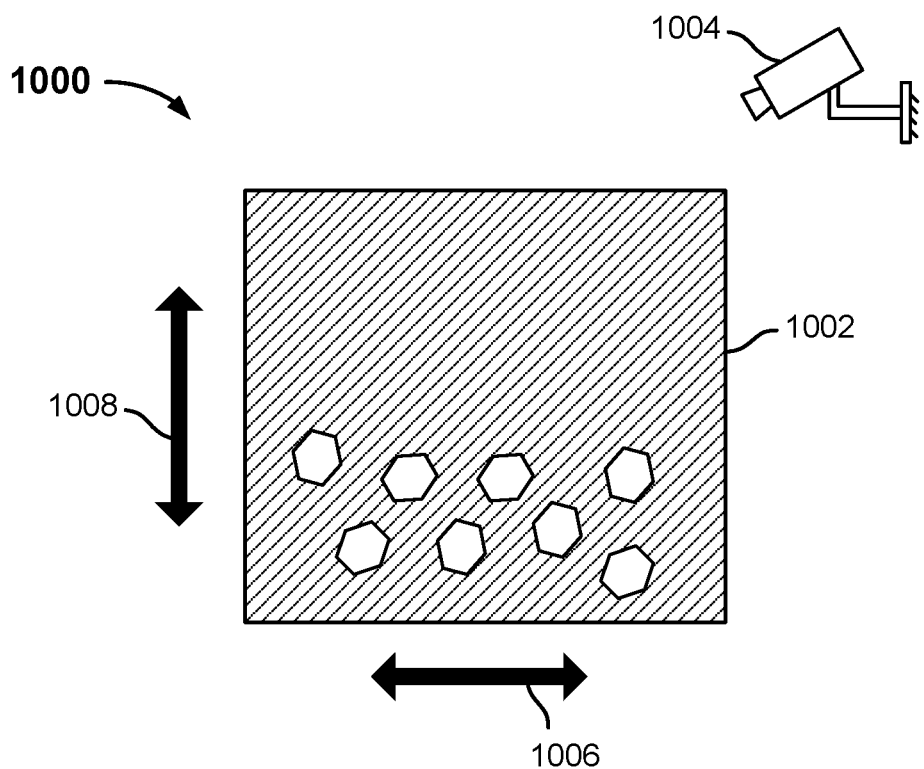
FIG. 10 illustrates an example of a pick-up zone in an embodiment of a robotic kitting system.

FIG. 10 illustrates an example of a pick-up zone in an embodiment of a robotic kitting system. In the example shown, robotic kitting system 1000 includes a pick-up zone 1002 fed by elements not shown in FIG. 10 (e.g., one or more conveyor belts, motorized rollers, ramps or slides, etc.). The pick-up zone 1002 comprises in the example shown a x-y table or similar structure configured to be moved, jolted, shaken, etc., in the x- and/or y-direction(s), as indicated by arrows 1006 and 1008. For example, computer-controlled linear motors or other actuators configured to move the pick-up zone 1002 in the x- and/or y-direction(s) in various embodiments are operated by a computer or other processor, not shown in FIG. 10, based on image data generated by camera 1004, to achieve a desired density, distribution, orientation, etc. of items on pick-up zone 1002.

Figure 11:
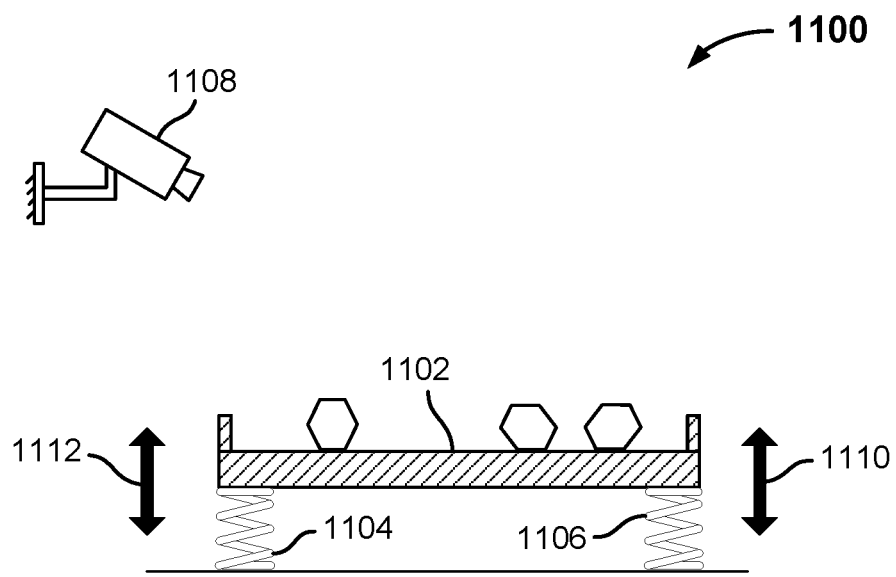
FIG. 11 illustrates an example of a pick-up zone in an embodiment of a robotic kitting system.

FIG. 11 illustrates an example of a pick-up zone in an embodiment of a robotic kitting system. In the example shown, robotic kitting system 1100 includes a pick-up zone 1102 mounted on springs or other non-rigid dampeners 1104, 1106 and including motors, solenoids, vibrators, and/or other computer-controlled structures (not shown) to impart up/down force and/or movement to the pick-up zone 1102, as indicated by arrows 1110, 1112, to achieve a desire distribution, spacing, orientation, etc. of items on the pick-up zone 1102. In various embodiments, the pick-up zone 1102 is manipulated by a computer or other processor (not shown) based on image data generated by camera 1108 to achieve the desired distribution, spacing, orientation, etc. of items on the pick-up zone 1102.

For example, the pick-up zone 1102 may be manipulated through successive iterations to achieve a state in which the robotic kitting system has one or more strategies available to pick up one or more items from the pick-up zone 1102. In each iteration, image data generated by camera 1108 may be used to determine a manner in which to manipulate the pick-up zone 1102 (e.g., which motor(s) or other motive force to use, how much or how long to activate the motive force, etc.) in that iteration. For example, the robotic kitting system in some embodiments is trained, using machine learning techniques, to manipulate the pick-up zone 1102 in different ways given different starting conditions to achieve (or more likely achieve) a state in which the robotic kitting system has viable strategies to pick up items from the pick-up zone 1102 without human intervention.

Figure 12A:
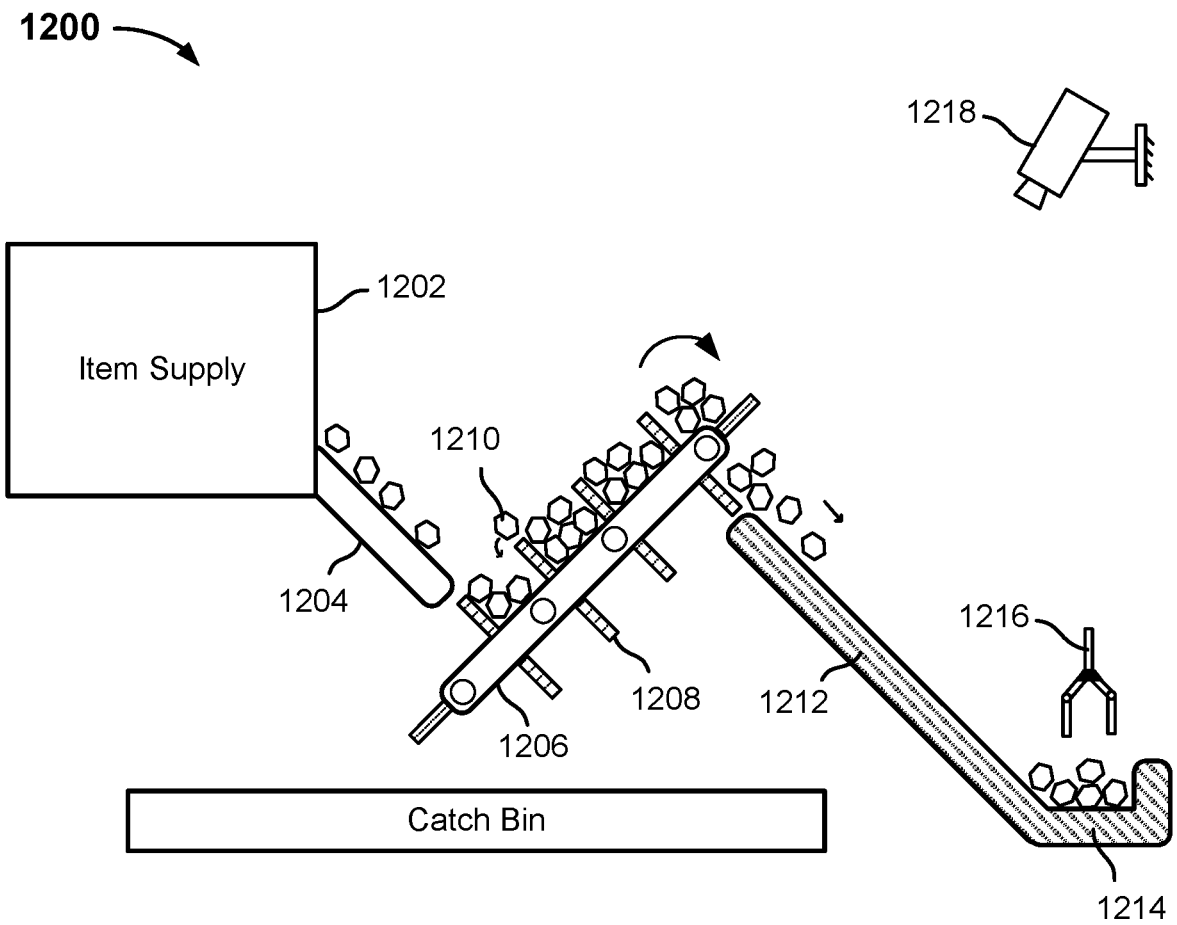
FIG. 12A illustrates an embodiment of a robotic kitting system.

FIG. 12A illustrates an embodiment of a robotic kitting system. In the example shown, robotic kitting system 1200 includes an item supply source 1202 from which items are gravity-fed via ramp, slide, chute, etc. 1204 to a segmented conveyor 1206 provided with partitions or paddles 1208 that define limited-capacity bins or segments. Items in excess of the capacity fall back into the next segment (see item 1210, for example) and/or into a catch bin or basin below the conveyor 1206. Items are carried upward by conveyor 1206 and deposited onto a ramp 1212 feeding a pick-up zone 1214 from which items are retrieved by robotic arm and gripper 1216. A computer or other processor (not shown) uses image data generated by camera 1218 to operate one or more of the item supply 1202 and the conveyor 1206 to achieve and maintain a desired level of supply of items in the pick-up zone 1214.

In some embodiments, a rail mounted or otherwise at least partly movable robot is used in combination with movable kitting shelf machines and/or modules. The latter machines/modules in various embodiments may be moved from one location to another, for example to better enable items carried on or within the machine/module to be positioned in a dynamically relocatable "pick-up zone" of the machine/module, e.g., to facilitate use of the robot (e.g., rail-mounted or otherwise movable and/or stationary robotic arm and gripper) to retrieve items from the pick-up zone. For example, in some embodiments, a procession or series of modules/machines may move, under locomotion, pushed from behind, pulled from the side, riding on a car wash style conveyor, etc., through an active area. The machine/module may position items for pick up and/or items may be located statically on a bin, shelf, etc. on the machine/module. Items to be kitted may be fed or otherwise stage on or into the successive machines/modules. Computer vision, optical or RF scanners, etc. may be used to determine which items are available in which machines/modules, e.g., as the machines/modules move through the active area, and the machines/modules, the equipment used to move them through the active area, and/or the robotic arm are controlled in a coordinated manner to move items into position to be retrieved by the robotic arm and kitted.

Figure 12B:
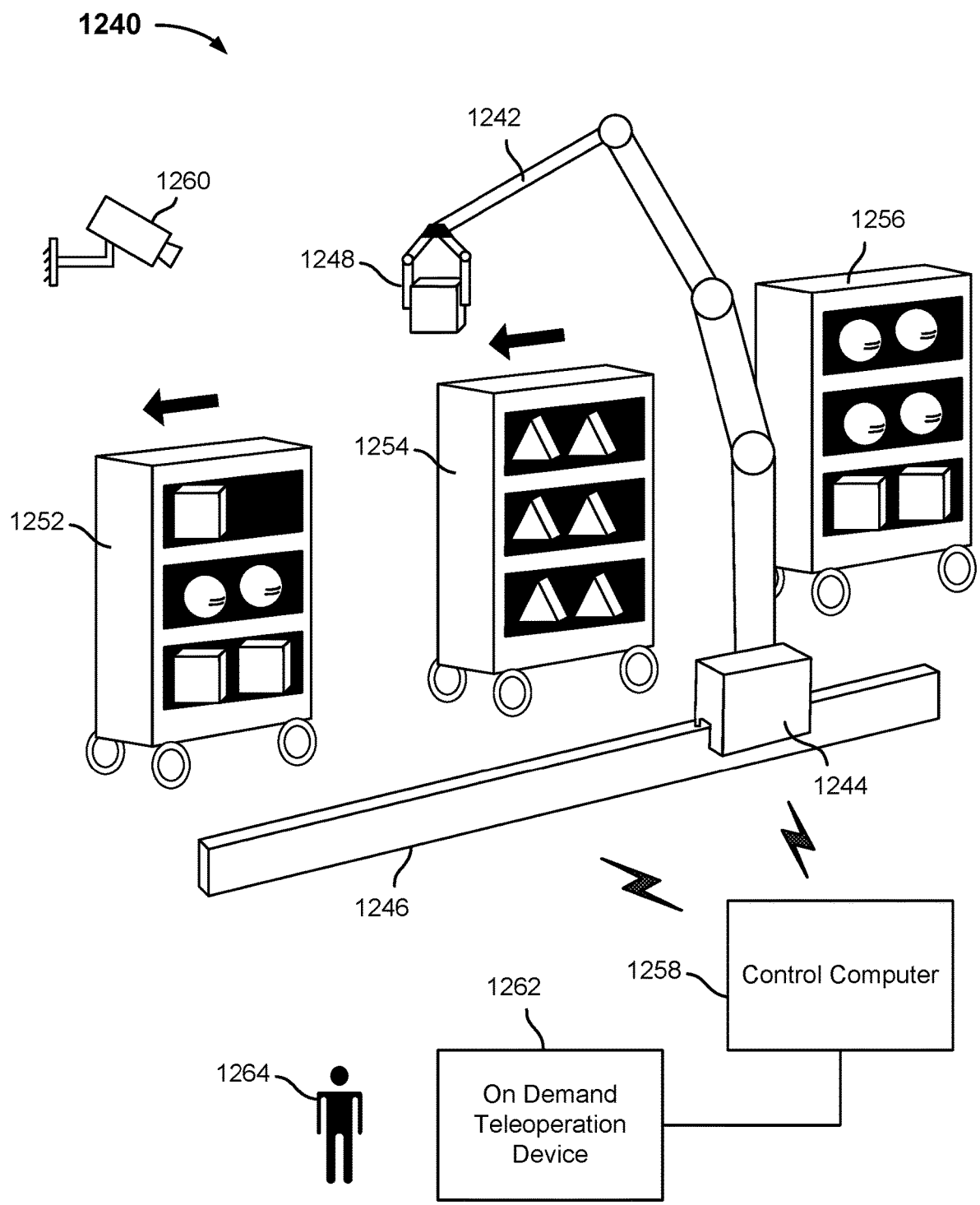
FIG. 12B illustrates an embodiment of a robotic kitting system with moving shelf modules/machines.

FIG. 12B illustrates an embodiment of a robotic kitting system with moving shelf modules/machines. In the example shown, kitting system 1240 includes a robotic arm 1242 mounted on a carriage 1244 that is movable along a rail 1246. Robotic arm 1242 terminates in a gripper 1248. Movable kitting shelf modules 1252, 1254, and 1256 are shown being moved through an active zone adjacent to rail 1246 within reach of robotic arm 1242. In the state shown, gripper 1248 has been used to retrieve an item from a shelf of kitting shelf module 1252, which in turn is being moved out of the active area, as indicated by the arrow pointing to the left, while kitting shelf module 1254 is moved into position in the active area and kitting shelf module 1256 is in an "on deck" or staging position, waiting to be moved into the active zone.

Kitting system 1240 is controlled in this example by control computer 1258. In various embodiments, control computer 1258 uses image data from camera 1260, in this example mounted in the physical space in which kitting system 1240 is located, and/or other sensors (e.g., cameras or other sensors mounted on robotic arm 1242 and/or kitting shelf modules 1252, 1254, and 1256, along with packing list or other information, to determine which items are available and needed from which ones of the kitting shelf modules 1252, 1254, and 1256, and to position the kitting shelf modules 1252, 1254, and 1256 and/or robotic arm 1242 as needed, in a coordinated manner, to select, retrieve, and kit the required items.

In the example shown, an on demand teleoperation device 1262 may be used by a human operator 1264, e.g., if/as required, to complete or continue the kitting operation. For example, if control computer 1258 determines the system 1240 is in a state in which the control computer 1258 does not have a (further) strategy to continue fully automated operation, control computer 1258 may prompt the user 1264 to use on demand teleoperation device 1262 to control elements of the system 1240 as needed to continue/complete the kitting operation.

While in the example shown the kitting shelf modules 1252, 1254, and 1256 have inactive recessed shelves from which items are retrieved, in various embodiments kitting shelf modules 1252, 1254, and 1256 may include active elements controlled by control computer 1258, such as shelves that extend out of the kitting shelf modules 1252, 1254, and 1256 to facilitate item retrieval, elements that push items to a more accessible pick-up zone within the kitting shelf modules 1252, 1254, and 1256, elements to self-propel the kitting shelf modules 1252, 1254, and 1256 through an active zone adjacent to rail 1246, etc.

In the example shown in FIG. 12B mobile kitting shelf modules 1252, 1254, and 1256 are used in combination with a robotic arm 1242 that is movable along rail 1246. In various alternative embodiments, robotic arm 1242 may be fully mobile (e.g., remote controlled chassis, such as a four wheel or two tractor mounted chassis), may be stationary/fixed, and/or may be mounted on a vertical rail.

Figure 13:
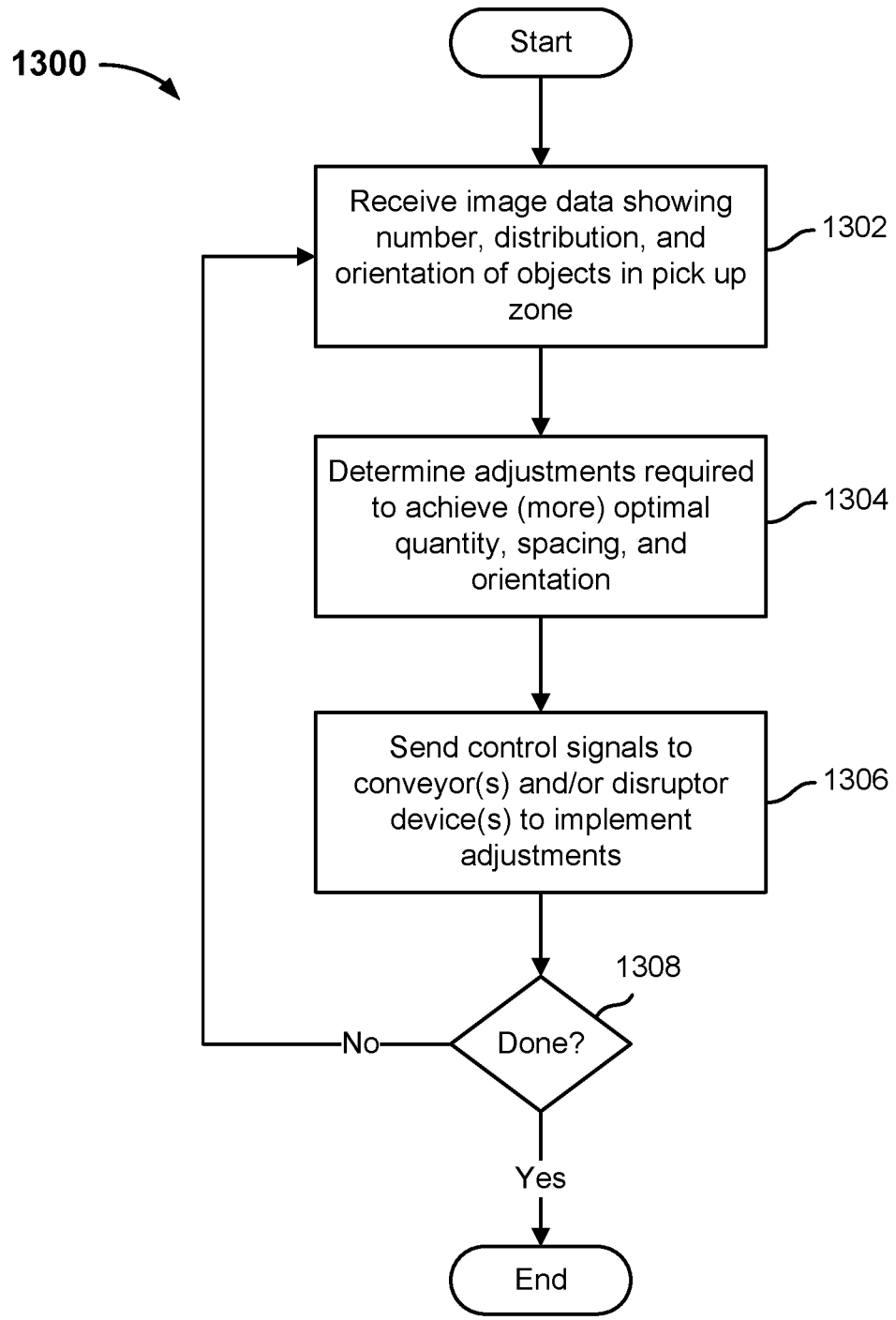
FIG. 13 is a flow chart illustrating an embodiment of a process to operate a robotic kitting system.

FIG. 13 is a flow chart illustrating an embodiment of a process to operate a robotic kitting system. In various embodiments, the process 1300 of FIG. 13 is implemented by a computer or other processor configured to control a robotic kitting system as disclosed herein, such as control computer 122 in the example shown in FIG. 1. In some embodiments, for example, the process of FIG. 13 is implemented by a processor comprising or otherwise associated with a robotic kitting system, such as the systems of FIGS. 2 through 12.

In the example shown in FIG. 13, image data showing a number, distribution, and orientation of objects in a pick-up zone is received (1302). For example, a camera comprising and/or otherwise associated with a robotic kitting system as disclosed herein may have generated and provided the image data to the processor. In various embodiments, data from one or more other and/or different sensors may be received, for example and without limitation data from one or more other cameras providing image data from other than the pick-up zone (e.g., from conveyors or other structures configured to deliver items to the pick-up zone), weight sensors, pressure sensors, LIDAR, infrared sensors, RF sensors, optical sensors, contact switches or sensors, etc. may be received and processed.

Adjustments to achieve a (more) optimal quantity, spacing, and orientation of items in the pick-up zone (1304). In various embodiments, the adjustments are determined without human intervention, e.g., based on a machine learning-generated model by which the processor has been configured to determine adjustments to achieve a (more) optimal quantity, spacing, and orientation of items in the pick-up zone based on image and other sensor data showing a current state and/or context. In some embodiments, context data such as a current set of kitting requirements (e.g., invoices, orders, etc. currently being fulfilled) is taken into consideration, for example to anticipate upcoming needs as to which items and which quantities are anticipated to be required to be available to be retrieved from the pick-up zone. In various embodiments, adjustments may include starting/stopping feed mechanisms, such as conveyor belts, powered rollers, etc.; increasing/decreasing the speed of operation of feed mechanisms; adjusting mechanism provided to disrupt or alter the trajectory of items being translated to the pick-up zone (e.g., baffles 532, 534 of FIG. 5B; turntables 806 of FIG. 8); etc.

In some embodiments, adjustments are determined based at least in part on the strategies determined to be available to retrieve items from the pick-up zone. If no or limited strategies are determined to be available based on a current state of items in the pick-up zone, adjustments expected (e.g. based on machine learning, a programmed model, etc.) to alter the conditions to (potentially) make (more) strategies available to retrieve items without human intervention are determined and implemented.

Control signals to implement the determined adjustments are sent to conveyance and/or disruption devices, as applicable (1306). For example, conveyor belts, powered rollers, etc. may be started or stopped, or increased or decreased in speed. Or, disruptor devices such as baffles 532, 534 of FIG. 5B may be repositioned, or turntables 806 of FIG. 8 may be started or stopped, or increased or decreased in speed, or switched to operate in an opposite direction.

Image or other sensor data continues to be monitored (1302) and further adjustments determined and implemented (1304, 1306) as the robotic kitting operation continues (1308). Once the kitting operation is done (1308), the process ends.

In some embodiments, if an adjustment cannot be determined to provide a strategy to retrieve items from the pick-up zone through automated processing a prompt or other action to obtain human intervention is generated. For example, conveyance structures and/or disruptor devices may be operated by a human operator, such as through teleoperation, to provide the quantity, spacing, or orientation required to retrieve items from the pick-up zone, or a human operator may operate a robotic arm/gripper to move items around in the pick-up zone, or a human operator in the vicinity may physically rearrange items to provide a context in which fully automated operation may resume.

Figure 14:
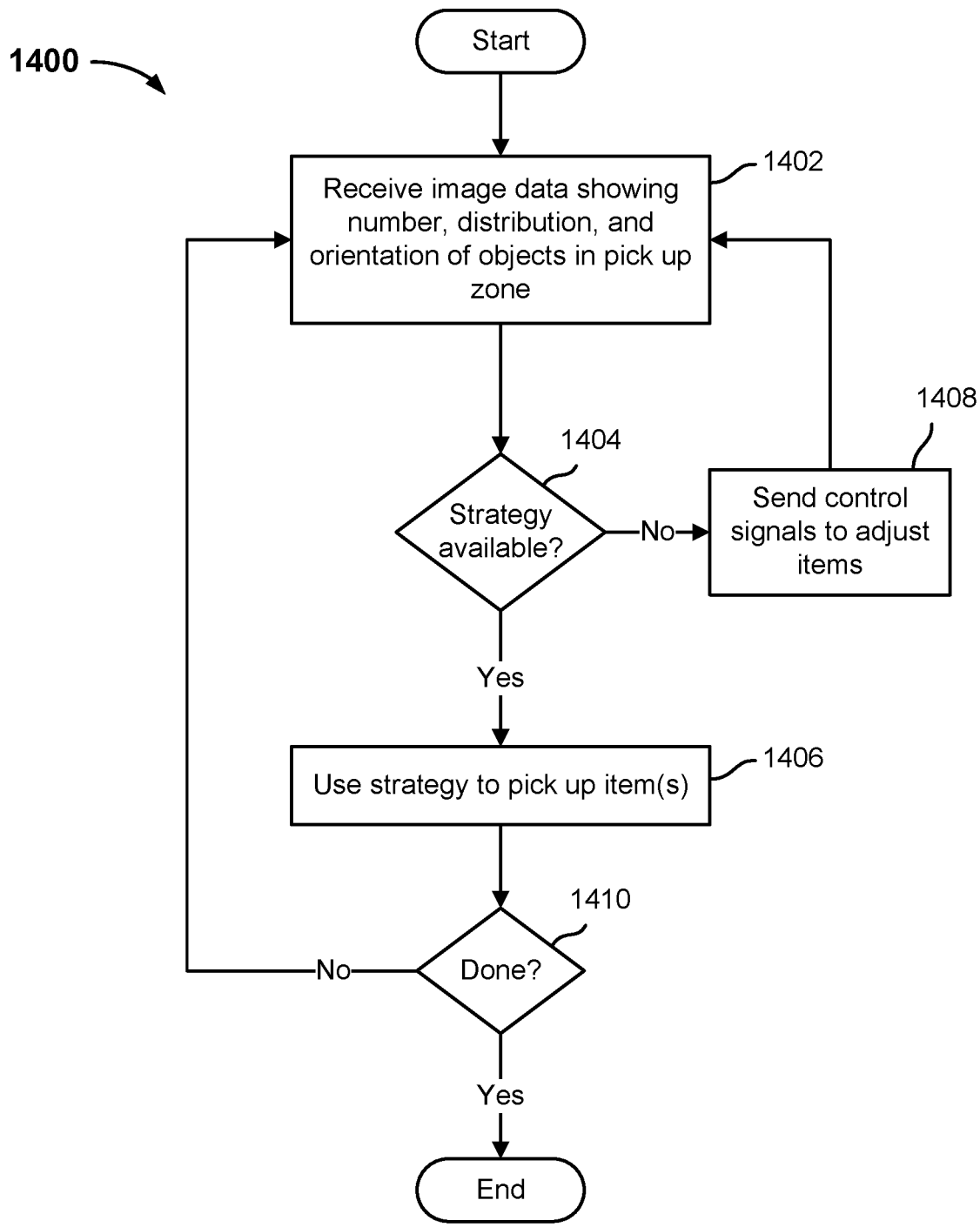
FIG. 14 is a flow chart illustrating an embodiment of a process to operate a robotic kitting system.

FIG. 14 is a flow chart illustrating an embodiment of a process to operate a robotic kitting system. In various embodiments, the process 1400 is implemented by a processor comprising or otherwise associated with a robotic kitting system based at least in part on the availability of strategies to retrieve items from a pick-up zone. In the example shown, image (and/or other sensor data) indicating a number, distribution, and/or orientation of items in a pick-up zone is received (1402). If a strategy is available to use a robotic arm or other robotic retrieval device to retrieve a required item through automated operation (1404), the strategy is used to retrieve the item (1406). If no strategy is (or is anticipated to become) available (1404), one or more control signals are determined and sent to adjust items in the pick-up zone (1408). In various embodiments, the control signal(s) is/are determined to create a context in which a strategy to retrieve the required item(s) will be (or is more likely to be) available. Once the control signals have been sent, further image (and/or other sensor data is processed (1402), and if a strategy to retrieve the item(s) has become available (1404) the strategy is implemented (1406). If not, a further iteration of adjustment may be performed (1404, 1408) unless/until a strategy becomes available (1404) or, in some embodiments, if no strategy becomes available after a timeout or prescribed number of attempts human intervention, such as by teleoperation, is invoked.

Figure 15:
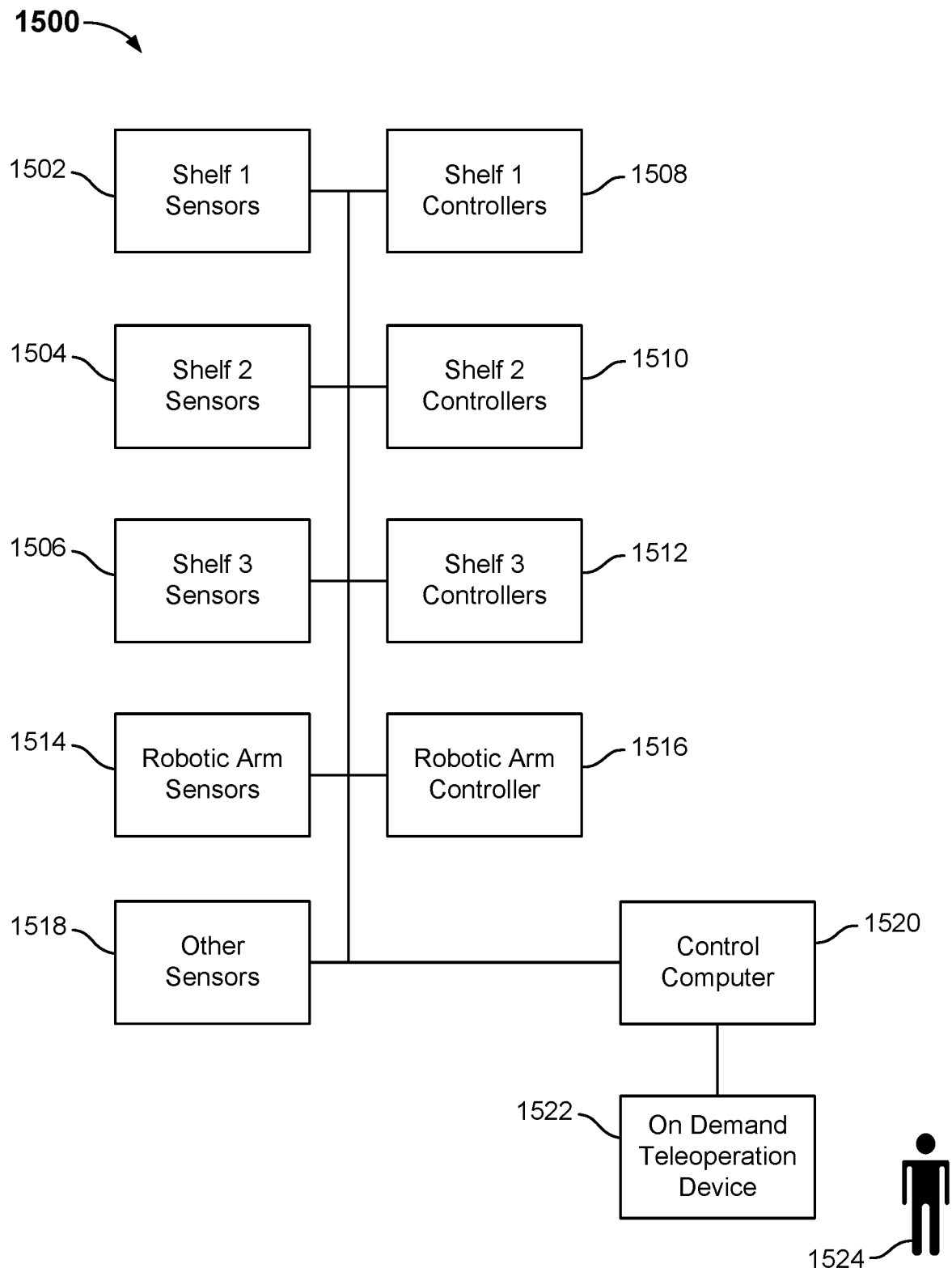
FIG. 15 is a block diagram illustrating an embodiment of a kitting system.

FIG. 15 is a block diagram illustrating an embodiment of a kitting system. In various embodiments, kitting system 1500 of FIG. 15 represents operational elements and the network connections between them to implement a kitting system such as system 100 of FIG. 1. In the example shown, kitting system 1500 includes a plurality of sets of shelf sensors 1502, 1504, 1506, each associated with a corresponding shelf comprising a kitting machine, such as kitting machine 102 of FIG. 1. Examples of shelf sensors 1502, 1504, and 1506 include, in various embodiments and without limitation, cameras, optical scanners, and other optical sensors; pressure sensors, weight sensors, limit switches, and other contact sensors; etc. Sensors 1502, 1504, and 1506 may be configured to generate sensor output data to be used, in various embodiments, to determine the presence, absence, quantity, type, nature, attributes, orientation, and/or other data associated with items the corresponding shelf has been stocked with and/or is otherwise associated with.

Each set of sensors 1502, 1504, and 1506, is associated with a corresponding shelf controller 1508, 1510, and 1512, respectively. Each shelf controller 1508, 1510, and 1512 is configured, in various embodiments, to be used to control the components comprising the shelf, such as to extend the shelf or an upper tray thereof, as in the example shown in FIG. 1, to adjust the tilt angle of the shelf, to operate a belt conveyor or other motive or propulsive force and/or instrumentality of the shelf configured to position and/or orient items on the shelf to position them for pick-up, etc.

System 1500 further includes robotic arm sensors 1514 and robotic arm controller 1516. In various embodiments, robotic arm sensors 1514 may include one or more cameras, pressure sensors, weight sensors, robotic arm segment position sensors, etc. In various embodiments, robotic arm controller 1516 may be used to operate an associated robotic arm, e.g., to reposition the robotic arm to a position from which it can retrieve an item, to pick the item up, to move the item to a box, conveyor, or other destination, etc.

System 1500 includes others sensors 1518, which may include other sensors in the environment in which the system 1500 operates, such as a camera mounted in the environment, e.g., camera 124 of FIG. 1.

In the example shown, control computer 1520 is connected via a network (e.g., wifi, peer-to-peer, etc.). In various embodiments, control computer 1520 is configured to use sensor data generated by the shelf, robotic arm, and other sensors, 1502, 1504, 1506, 1514, and 1518, to determine and implement a strategy to complete a kitting task, e.g., by controlling the operation one or more shelves and the robotic arm via commands sent via the network to the respective shelf controllers 1508, 1510, and/or 1512 and robotic arm controller 1516.

In the example shown, control computer 1520 is connected via a network connection to on demand teleoperation device 1522, which is configured to be used by human operator 1524, as required, to intervene to help complete a kitting task, as described above.

In various embodiments, techniques disclosed herein may be used to provide a (more) fully automated robotic kitting system, including by providing automated control of conveyance mechanisms and/or other devices comprising the robotic kitting system, based at least in part on image and/or other sensor data, to provide items in a pick-up zone in a quantity, distribution, and/or orientation (more) conducive to (more fully) automated retrieval of items from the pick-up zone, e.g., using a robotic arm and gripper and/or another robotic retrieval device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A kitting system, comprising:
    a conveyance structure configured to impart to an item a first net resultant force substantially in a first direction, wherein the first direction is associated with a direction of flow from a source end of the conveyance structure to a destination end opposite the source end and associated with a pick-up zone from which the item is to be retrieved;
    a sensor configured to provide a sensor output associated with the pick-up zone;
    a disrupter device configured to disrupt the flow of items on the conveyance structure by applying a repositioning force to items carried by the conveyance structure while the items are flowing on the conveyance structure; and
    a processor configured to (i) provide a control input to one or both of the conveyance structure and the disrupter device associated with the conveyance structure based at least in part on the sensor output, and (ii) determine a plan for controlling a robot to retrieve a required item from the pick-up zone;
    wherein:
        the processor uses the sensor output to determine a density, distribution, or orientation of a plurality of items in the pick-up zone;
        determining the plan for controlling the robot to retrieve the required item from the pickup zone comprises:
            determining whether any strategies exist for using the robot to retrieve the required item; and
            in response to determining, based on the sensor output, that no strategies exist for using the robot to retrieve the item, determining to adjust the plurality of items in the pick-up zone; and
        adjusting the plurality of items in the pick-up zone comprises using the processor to provide the control input to control the disrupter device to disrupt the flow of the item from the source end to the destination end based at least in part on (i) context data pertaining to a set of requirements indicating one or more types of items to be retrieved from the pickup zone and a quantity corresponding to the one or more types of items, and (ii) the density, distribution, or orientation of the plurality of items in the pick-up zone;
        the processor iteratively determines whether any strategies exist for retrieving the item and performs an iteration of adjusting the plurality of items in the pick-up zone until an earlier of (i) the processor identifies a strategy to retrieve the required item, and (ii) a predetermined number of iterations for attempting to determine a strategy and adjust the plurality of items has been performed; and
        the processor is configured to initiate human intervention by teleoperation based at least in part on a determination that the predetermined number of iterations for attempting to determine a strategy and adjust the plurality of items has been performed.

2. The system of claim 1, wherein the conveyance structure comprises an inclined conveyance surface that is higher at the source end than at the destination end.

3. The system of claim 2, wherein the conveyance surface comprises a ramp.

4. The system of claim 2, wherein the conveyance surface comprises a conveyor belt.

5. The system of claim 4, wherein the control input controls a speed with which the conveyor belt advances the item.

6. The system of claim 4, wherein the control input controls a time at which the conveyor belt advances the item.

7. The system of claim 1, wherein the sensor comprises a camera.

8. The system of claim 1, wherein the sensor comprises one or more of the following: a laser; a trip wire; a bar code, QR, or other optical code scanner; an ultrasound sensor; a LIDAR sensor; a thermal sensor; a weight sensor; and a force sensor.

9. The system of claim 1, wherein the conveyance structure comprises a first conveyor belt and the disrupter device comprises a second conveyor belt.

10. The system of claim 9, wherein the second conveyor belt advances in a second direction at least partly orthogonal to the first direction.

11. The system of claim 9, wherein the second conveyor belt advances in a second direction at least partly opposite the first direction.

12. The system of claim 9, wherein the control input includes one or both of a first command to operate the first conveyor belt at a first speed and a second command to operate the second conveyor belt at a second speed.

13. The system of claim 1, wherein disrupter device comprises a baffle, paddle, or other rigid structure.

14. The system of claim 1, wherein the disrupter device applies a second force to the item.

15. The system of claim 1, wherein the disrupter device generates and applies to the item a blast of air.

16. The system of claim 1, wherein the disrupter device generates and applies a second force to the item by shaking or vibrating one or both of the item and the pick-up zone.

17. The system of claim 1, further comprising the disrupter device.

18. The system of claim 1, wherein the processor is configured to provide the control input based at least in part on a selected strategy to autonomously retrieve the item from the pick-up zone with a robotic arm and gripper.

19. The system of claim 18, wherein the processor is configured to learn through autonomous machine learning said selected strategy to autonomously retrieve the item from the pick-up zone with a robotic arm and gripper.

20. The system of claim 18, wherein the selected strategy is included in a plurality of strategies to pick the required item up from the pick-up zone and the processor is configured to determine the control input at least in part by evaluating at least available ones of the plurality of strategies and determining based at least in part on the sensor output that providing the control input will increase the likelihood that the strategy will be available to pick up the item from the pick-up zone.

21. The kitting system of claim 1, wherein the processor controls the disrupter device to change a configuration of the disrupted device based on a determined strategy to achieve a threshold density, distribution, or orientation of a plurality of items in the pick-up zone.

22. The kitting system of claim 1, wherein:
the conveyance structure comprises a conveyor belt; and
the processor controls the disrupter device to disrupt the flow of the item while the conveyor belt is operated to move items in the first direction.

23. The kitting system of claim 1, wherein the processor determines to control the disrupter device in response to a determination that a strategy of using the disrupter device to disrupt the flow of the item is expected to increase a likelihood of successful kitting of at least a subset of the plurality of items in the pick-up zone.

24. The kitting system of claim 1, wherein the processor controls the disrupter device to disrupt the flow of the item in response to a determination that a density of the plurality of items in the pick-up zone exceeds a threshold density.

25. The kitting system of claim 1, wherein the disrupter device disrupts the flow of the item by causing the item to flow in a direction opposite to a direction to the pickup zone, or in a direction that is perpendicular to the direction to the pickup zone.

26. The kitting system of claim 1, wherein the required item is determined based at least in part on an order or a pick list.

27. The kitting system of claim 1, wherein the disrupter device is controlled to engage the item to (i) direct the item to a more centered position on the conveyance structure, or (ii) rotate or alter a position of the item.

28. A method, comprising:
using a conveyance structure configured to impart to an item a first net resultant force substantially in a first direction, wherein the first direction is associated with a direction of flow from a source end of the conveyance structure to a destination end opposite the source end and associated with a pick-up zone from which the item is to be retrieved; and
using a processor to (i) provide a control input to one or both of the conveyance structure and a disrupter device associated with the conveyance structure based at least in part on output of a sensor associated with the pick-up zone, and (ii) determine a plan for controlling a robot to retrieve a required item from the pick-up zone;
wherein:
the disrupter device is configured to disrupt the flow of items on the conveyance structure by applying a repositioning force to items carried by the conveyance structure while the items are flowing on the conveyance structure;
the processor uses the sensor output to determine a density, distribution, or orientation of a plurality of items in the pick-up zone;
determining the plan for controlling the robot to retrieve the required item from the pickup zone comprises:
determining whether any strategies exist for using the robot to retrieve the required item; and
in response to determining, based on the sensor output, that no strategies exist for using the robot to retrieve the item, determining to adjust the plurality of items in the pick-up zone; and
adjusting the plurality of items in the pick-up zone comprises using the processor to provide the control input to control the disrupter device to disrupt the flow of the item from the source end to the destination end based at least in part on (i) context data pertaining to a set of requirements indicating one or more types of items to be retrieved from the pickup zone and a quantity corresponding to the one or more types of items, and (ii) the density, distribution, or orientation of the plurality of items in the pick-up zone;
the processor iteratively determines whether any strategies exist for retrieving the item and performs an iteration of adjusting the plurality of items in the pick-up zone until an earlier of (i) the processor identifies a strategy to retrieve the required item, and (ii) a predetermined number of iterations for attempting to determine a strategy and adjust the plurality of items has been performed; and
the processor is configured to initiate human intervention by teleoperation based at least in part on a determination that the predetermined number of iterations for attempting to determine a strategy and adjust the plurality of items has been performed.

29. A computer program product embodied in a non-transitory computer readable medium and comprising computer instructions that, when executed by one or more processors, cause the one or more processors to:
control a conveyance structure configured to impart to an item a first net resultant force substantially in a first direction, wherein the first direction is associated with a direction of flow from a source end of the conveyance structure to a destination end opposite the source end and associated with a pick-up zone from which the item is to be retrieved;
use the sensor output to determine a density, distribution, or orientation of a plurality of items in the pick-up zone;
determine a plan for controlling a robot to retrieve a required item from the pick-up zone; and
provide a control input to one or both of the conveyance structure and a disrupter device associated with the conveyance structure based at least in part on output of a sensor associated with the pick-up zone; and wherein:

the disrupter device is configured to disrupt the flow of items on the conveyance structure by applying a repositioning force to items carried by the conveyance structure while the items are flowing on the conveyance structure;

determining the plan for controlling the robot to retrieve the required item from the pickup zone comprises:

determining whether any strategies exist for using the robot to retrieve the required item; and in response to determining, based on the sensor output, that no strategies exist for using the robot to retrieve the item, determining to adjust the plurality of items in the pick-up zone; and adjusting the plurality of items in the pick-up zone comprises providing the control input to control the disrupter device to disrupt the flow of the item from the source end to the destination end based at least in part on (i) context data pertaining to a set of requirements indicating one or more types of items to be retrieved from the pickup zone and a quantity corresponding to the one or more types of items, and (ii) the density, distribution, or orientation of the plurality of items in the pick-up zone;

the processor iteratively determines whether any strategies exist for retrieving the item and performs an iteration of adjusting the plurality of items in the pick-up zone until an earlier of (i) the processor identifies a strategy to retrieve the required item, and (ii) a predetermined number of iterations for attempting to determine a strategy and adjust the plurality of items has been performed; and the processor is configured to initiate human intervention by teleoperation based at least in part on a determination that the predetermined number of iterations for attempting to determine a strategy and adjust the plurality of items has been performed.

* * * * *